(12) United States Patent
Futaki

(10) Patent No.: US 10,945,135 B2
(45) Date of Patent: *Mar. 9, 2021

(54) RADIO STATION, RADIO TERMINAL, AND METHOD THEREFOR

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,754

(22) Filed: Jan. 21, 2020

(65) Prior Publication Data

US 2020/0162932 A1     May 21, 2020

Related U.S. Application Data

(63) Continuation of application No. 15/505,810, filed as application No. PCT/JP2015/002111 on Apr. 17, 2015, now Pat. No. 10,575,183.

(30) Foreign Application Priority Data

Sep. 12, 2014  (JP) ................................ 2014-186950

(51) Int. Cl.
  *H04W 16/14*      (2009.01)
  *H04W 48/16*      (2009.01)
  (Continued)

(52) U.S. Cl.
  CPC ........... *H04W 16/14* (2013.01); *H04W 16/32* (2013.01); *H04W 48/16* (2013.01); *H04W 48/18* (2013.01);
  (Continued)

(58) Field of Classification Search
  CPC ..... H04W 72/02; H04W 48/16; H04W 16/32; H04W 16/14; H04W 48/18
  See application file for complete search history.

(56) References Cited

U.S. PATENT DOCUMENTS 7,443,821 B2    10/2008    Cave et al.
2007/0004423 A1    1/2007    Gerlach et al.
(Continued)

FOREIGN PATENT DOCUMENTS

CN      102812772 A    12/2012
CN      103580840 A    2/2014
(Continued)

OTHER PUBLICATIONS

Japanese Notice of Reasons for Refusal issued in Japanese Patent Application No. 2019-129217, dated Mar. 10, 2020, 6 pages.
(Continued)

*Primary Examiner* — Gbemileke J Onamuti
(74) *Attorney, Agent, or Firm* — Wilmer Cutler Pickering Hale and Dorr LLP

(57) ABSTRACT

A radio station (1) is configured to transmit to a radio terminal (3), on a licensed frequency (Cell #1), a notification regarding detection of proximity to a non-serving cell (Cell #2) on an unlicensed frequency (S102) and to receive from the radio terminal (3), on the licensed frequency (Cell #1), a result of the detection performed by the radio terminal (3) in response to the notification. This contributes, for example, to acquisition of information useful for the radio station to determine whether to allow the radio terminal to perform communication on the unlicensed frequency.

18 Claims, 17 Drawing Sheets

(51) Int. Cl.
*H04W 16/32* (2009.01)
*H04W 72/02* (2009.01)
*H04W 48/18* (2009.01)
*H04W 28/08* (2009.01)
*H04W 72/04* (2009.01)

(52) U.S. Cl.
CPC ............ *H04W 72/02* (2013.01); *H04W 28/08* (2013.01); *H04W 72/0406* (2013.01)

(56) References Cited

U.S. PATENT DOCUMENTS

| | | |
|---|---|---|
| 2011/0287794 A1 | 11/2011 | Koskela et al. |
| 2013/0265984 A1 | 10/2013 | Li et al. |
| 2013/0336224 A1 | 12/2013 | Davydov et al. |
| 2014/0043979 A1 | 2/2014 | Etemad et al. |
| 2014/0051485 A1 | 2/2014 | Wang et al. |
| 2015/0050939 A1 | 2/2015 | Futaki et al. |
| 2016/0081029 A1 | 3/2016 | Wang et al. |
| 2016/0183325 A1 | 6/2016 | Harada et al. |
| 2017/0094528 A1 | 3/2017 | Takeda et al. |
| 2017/0118758 A1 | 4/2017 | Li |

FOREIGN PATENT DOCUMENTS

| | | |
|---|---|---|
| CN | 103765824 A | 4/2014 |
| JP | 2014-060793 A | 4/2014 |
| WO | WO-2012/121757 A1 | 9/2012 |
| WO | WO-2013/161135 A1 | 10/2013 |
| WO | WO-2014/112595 A1 | 7/2014 |

OTHER PUBLICATIONS

3GPP RP-131635 Introducing LTE in Unlicensed Spectrum; Qualcomm, Ericsson RAN #62, Busan, South Korea (Dec. 2013) (8 pages).

3GPP TR 36.842 V12.0.0 Study on Small Cell Enhancements for E-UTRA and E-UTRAN; Higher layer aspects (Release 12) (Dec. 2013) (pp. 1-71).

3GPP TS 36.300 V12.2.0 Evolved Univeral Terrestrial Radio Access (E-UTRA) and Evolved Universal Terrestrial Radio Access Network (E-UTRAN); Overall description; Stage 2 (Release 12) (Jun. 2014) (pp. 1-215).

3GPP TS 36.331 V12.2.0 Evolved Universal Terrestrial Radio Access (E-UTRA); Radio Resource Control (RRC); Protocol specification (Release 12) (Jun. 2014) (pp. 1-365).

3GPP TSG RAN Meeting #65, Edinburgh, Scotland; ZTE, Qualcomm Incorporated; Supporting Dual Connectivity in LTE-U; RP-141470 (Sep. 9, 2014) (6 pages).

3GPP TSG RAN WG1 Meeting #78bis, Ljubljana, Slovenia; Alcatel-Lucent Shanghai Bell, Alcatel-Lucent; Considerations on LBT Enhancements for Licensed-Assisted Access; R1-144083 (Sep. 27, 2014) (7 pages).

3GPP workshop on LTE in Unlicensed Spectrum: European Regulation and Co-existence Considerations, RWS-140002; Sari Nielsen & Antti Toskala, Nokia Corporation, NSN; Sophia Antipolis, France (Jun. 2014) (pp. 1-13).

Extended European Search Report issued by the European Patent Office for European Application No. 15839672.1 dated Mar. 29, 2018 (7 pages).

International Search Report corresponding to PCT/JP2015/002111 dated Jun. 2, 2015 (one page).

Notification of Reasons for Refusal issued by the Japan Patent Office for Japanese Application No. 2016-547654 dated Dec. 4, 2018 (7 pages).

Chinese Notification of First Office Action issued in Chinese Patent Application No. 201580049237.1, dated Jun. 27, 2019, 37 pages.

Fig. 5

*OtherConfig* information element

```
-- ASN1START

OtherConfig-r9 ::= SEQUENCE {
    reportProximityConfig-r9        ReportProximityConfig-r9        OPTIONAL,   -- Need ON
    ...,
    [[ idc-Config-r11                IDC-Config-r11                  OPTIONAL,   -- Need ON
       powerPrefIndicationConfig-r11 PowerPrefIndicationConfig-r11   OPTIONAL,   -- Need ON
       obtainLocationConfig-r11      ObtainLocationConfig-r11        OPTIONAL    -- Need ON
    ]],
    [[ reportProximityUnlicensedConfig-r1x  ReportProximityUnlicensedConfig-r1x  OPTIONAL,  -- Need ON
    ]]
}

/* skip :/

ReportProximityConfig-r9 ::= SEQUENCE {
    proximityIndicationEUTRA-r9     ENUMERATED {enabled}            OPTIONAL,   -- Need OR
    proximityIndicationUTRA-r9      ENUMERATED {enabled}            OPTIONAL    -- Need OR
}

ReportProximityUnlicensedConfig-r1x ::= SEQUENCE {
    proximityIndicationUnlicensed-r1x  ENUMERATED {enabled}
    carrierFreq-r1x                 ARFCN-ValueEUTRA,               OPTIONAL,
    carrierFreq2-r1x                ARFCN-ValueEUTRA-v9e0,          OPTIONAL,
    PhysCellId-r1x                  PhysCellId,                     OPTIONAL    -- Need OR
}

-- ASN1STOP
```

*ProximityIndicationUnlicensed message*

```
-- ASN1START proximityIndicationUnlicensed-r1x ::= SEQUENCE {
    criticalExtensions          CHOICE {
        c1                          CHOICE{
            proximityIndicationUnlicensed-r1x   proximityIndicationUnlicensed-r1x-IEs,
            spare3 NULL, spare2 NULL, spare1 NULL
        },
        criticalExtensionsFuture    SEQUENCE {}
    }
}

ProximityIndicationUnlicensed-r1x -IEs ::= SEQUENCE {
    type-r1x            ENUMERATED {entering, leaving},
    carrierFreq-r1x     CHOICE {
        eutra-r1x           ARFCN-ValueEUTRA,
        eutra2-r1x          ARFCN-ValueEUTRA-v9e0,
        ...
    },
    PhysCellId          PhysCellId,                 OPTIONAL,
    nonCriticalExtension SEQUENCE {}                OPTIONAL
}

-- ASN1STOP
```

Fig. 6

RADIO STATION, RADIO TERMINAL, AND METHOD THEREFOR

CROSS-REFERENCE TO RELATED APPLICATIONS

The present application is a continuation of U.S. patent application Ser. No. 15/505,810, entitled "Radio Station, Radio Terminal, And Method Therefor" filed on Feb. 22, 2017, which is a national stage application of International Application No. PCT/JP2015/002111 entitled "Wireless Station, Wireless Terminal, and Method Therefor" filed on Apr. 17, 2015, which claims priority to Japanese Application No. 2014-186950 filed on Sep. 12, 2014, the disclosures of which are hereby incorporated by reference in their entirety.

TECHNICAL FIELD

The present application relates to a radio communication system in which a radio station performs communication with a radio terminal on an unlicensed frequency or a shared frequency.

BACKGROUND ART

In order to improve the degradation of communication quality due to a sharp recent increase in mobile traffic and to provide faster high-speed communication, the 3GPP Long Term Evolution (LTE) has specified the Carrier Aggregation (CA) function that enables a radio terminal (User Equipment (UE)) to communicate with a radio base station (eNode B (eNB)) by using a plurality of cells. Note that cells that a UE can use in CA are limited to a plurality of cells of a single eNB (i.e., a plurality of cells operated or managed by a single eNB). The cells used by the UE in CA are categorized into a primary cell (PCell) that has already been used as a serving cell when CA is started and a secondary cell(s) (SCell(s)) that is used additionally or in a dependent manner. In the PCell, when a radio connection is (re-)established (Radio Resource Control (RRC) Connection Establishment, RRC Connection Re-establishment), Non Access Stratum (NAS) mobility information and security information (security input) are transmitted (see section 7.5 of Non-Patent Literature 1).

From a functional point of view, the introduction of CA has enabled high-speed communication. In practical usage, however, it is considered that it would be difficult to address the issue of a further increase in mobile traffic in the future due to limitations (shortage) of frequencies allocated to each operator. Accordingly, in the 3GPP standardization process, discussions on Unlicensed LTE that executes LTE with the use of an unlicensed frequency (unlicensed frequency hand, unlicensed spectrum) have been started (Non-Patent Literature 2 and 3). Unlicensed LTE is also referred to as LTE-U or U-LTE and is hereinafter referred to as LTE-U.

As methods for achieving LTE-U, two methods, i.e., Licensed Assisted Access (LAA) in which the eNB performs communication with the UE on the unlicensed frequency in association with the licensed frequency (e.g., as SCell of CA) and Standalone (SA) in which the eNB performs communication with the UE only on the unlicensed frequency, are considered. The unlicensed frequency is, for example, 5 GHz band, which is also used by other systems such as radar systems and wireless LAN (WLAN or also referred to as WiFi). Therefore, with regard to the SA scheme in which communication is performed only on the unlicensed frequency, it would be difficult to implement sophisticated controls specified for LTE and thus the more feasible LAA scheme (also referred to as LA-LTE) has mainly been discussed. In the following description, LTE-U by the LAA scheme, in which CA using the licensed frequency and the unlicensed frequency is performed, will be mainly explained. The licensed frequency means a dedicated frequency allocated to a specific operator. The unlicensed frequency means a frequency that is not allocated to a specific operator or a shared frequency allocated to a plurality of operators. In the latter case, this frequency may be referred to as a licensed shared frequency, not an unlicensed frequency, and communication using this frequency is also referred to as a Licensed Shared Access (LSA). In the following description, frequencies other than licensed frequencies dedicatedly licensed only to any specific operators are collectively referred to as an unlicensed frequency.

LTE-U by the LAA scheme is basically executed in accordance with the sequence shown in FIG. 17. In this example, it is assumed that the eNB performs data transmission (or reception) with a UE #1 in a Cell #1, which is the licensed frequency, and a cell #2, which is the unlicensed frequency. First, a radio connection is established between the eNB and the UE #1 in the Cell #1 (RRC Connection Establishment, S901) and a bearer is established between a core network (Evolved Packet Core: EPC) and the UE #1 (not shown). That is, the Cell #1 becomes the PCell for the UE #1. When there is downlink (DL) user data (also referred to as User Plane (UP) data) to be transmitted to the UE #1 or when there is uplink (UL) user data that the UE #1 wants to transmit, the eNB transmits or receives this user data in the Cell #1 (DL (or UL) UP data transmission, S902).

Next, when the eNB determines that it is efficient for the UE #1 to transmit and receive user data in the Cell #2 at some point (Trigger LTE-U for UE #1, S903), the eNB transmits, to the UE #1 in the Cell #1, control information about radio resource configuration for the Cell #2 (Radio Resource Configuration for Cell #2, S904). This control information corresponds to a RadioResourceConfigDedicated Information Element (IE) and a RadioResourceConfigCommon IE transmitted in an RRC Connection Reconfiguration message of the LTE (Non-Patent Literature 4). The Cell #2 hereby becomes the SCell for the UE #1. When the user data is transmitted in the downlink, the eNB performs sensing in the Cell #2 to determine whether the Cell #2 is available (Perform channel sensing, S905). Upon determining that the Cell #2 is available, the eNB transmits or receives user data to or from the UE #1 (DL (or UL) UP data transmission, S906). As described above, by the use of the unlicensed frequency, it is expected that the throughput will be further improved or the cell capacity will be increased.

The aforementioned sensing is referred to as Listen Before Talk (LBT) (Non-Patent Literature 2), which determines whether LTE-U by another operator or communication of another radio system (e.g., WLAN) is performed nearby on the target unlicensed frequency. The aforementioned sensing corresponds to, for example, Channel Availability Check (CAC) for radar systems and Clear Channel Assessment (CCA) executed by a WLAN Access Point (AP) (Patent Literature 1).

CITATION LIST

Non-Patent Literature

[Non-Patent Literature 1] 3GPP TS 36.300 V 12.2.0 (2014 June), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", June, 2014

[Non-Patent Literature 2] 3GPP RP-131635, "Introducing LTE in Unlicensed Spectrum", Qualcomm, Ericsson, December, 2013

[Non-Patent Literature 3] 3GPP workshop on LTE in unlicensed spectrum, RWS-140002, "LTE in Unlicensed Spectrum: European Regulation and Co-existence Considerations", Nokia, June, 2014

[Non-Patent Literature 4] 3GPP TS 36.331 V 12.2.0 (2014 June), "3rd Generation Partnership Project; Technical Specification Group Radio Access Network; Evolved Universal Terrestrial Radio Access (E-UTRA); Radio Resource Control (RRC); Protocol specification (Release 12)", June, 2014

[Non-Patent Literature 5] 3GPP TR 36.842 V 12.0.0 (2013 December), "3rd Generation Partnership Project; Technical Specification Group Radio Access Network; Study on Small Cell enhancements for E-UTRA and E-UTRAN; Higher layer aspects (Release 12)", December, 2013

Patent Literature

[Patent Literature 1] U.S. Pat. No. 7,443,821

SUMMARY OF INVENTION

Technical Problem

In the aforementioned background art, it is assumed that the base station (eNB) determines whether to allow the UE to perform communication in the cell (the Cell #2) on the unlicensed frequency based on terminal measurement report by the UE (measurement report by UE). For example, the eNB transmits to the UE in the cell on the licensed frequency (the Cell #1) an instruction for sending terminal measurement report, and the UE executes terminal measurement in the cell on the unlicensed frequency (the Cell #2 or the like) and reports, through the Cell #1, the result of the terminal measurement. The eNB determines whether it is appropriate to transmit user data to the UE based on the result of the terminal measurement in the Cell #2. The eNB may determine, for example, whether the reception quality (Reference Signal Received Power (RSRP) or Reference Signal Received Quality (RSRQ)) of a reference signal (RS) in the cell (the Cell #2 or the like) on the unlicensed frequency is equal to or larger than a predetermined value. When the eNB determines that the Cell #2 is appropriate for user data transmission, the eNB transmits user data to the UE (e.g., the UE #1 in Background Art) in the Cell #2.

However, if the terminal measurement report of normal LTE is used, there is a possibility that an appropriate UE is sometimes not allowed to perform communication (in a cell) on the unlicensed frequency. This is because, since the unlicensed frequency is shared with other communication systems as described above, the reference signal is not always transmitted, unlike in a cell of LTE. For example, the UE might calculate a value for the terminal measurement report by averaging reception quality during the period in which a reference signal is transmitted from another radio system and reception quality during the period in which the reference signal is not transmitted (in this case, the resulting value becomes an invalid value). Then the reception quality on the unlicensed frequency indicated in the terminal measurement report might be calculated to be lower than a threshold level that is defined to determine that it is appropriate to perform communication (in a cell) on the unlicensed frequency. In this case, even when it is determined that the unlicensed frequency is available based on the aforementioned sensing by the eNB (S905 in FIG. 16), unless an appropriate UE is allowed to use the unlicensed frequency, it may be impossible to provide sufficient improvement of performance (e.g., improvement of the throughput or increase in the cell capacity) by the use of the unlicensed frequency.

Accordingly, an object to be attained by embodiments disclosed herein is to provide an apparatus, a method, and a program that contribute to acquisition of information useful for a radio station (e.g., an eNB) to accurately determine whether to allow a radio terminal (a UE) to perform communication a cell) on an unlicensed frequency.

Solution to Problem

In a first aspect, a method performed in a radio station includes: (a) communicating with a radio terminal on a licensed frequency; (b) transmitting to the radio terminal, on the licensed frequency, a notification regarding detection of proximity to a non-serving cell on an unlicensed frequency; and (c) receiving from the radio terminal, on the licensed frequency a result of the detection performed by the radio terminal in response to the notification.

In a second aspect, a radio station includes a radio communication unit (a transceiver) and a control unit (a controller) The radio communication unit is configured to communicate on a licensed frequency and an unlicensed frequency. The control unit is configured to: transmit to a radio terminal, on the licensed frequency, a notification regarding detection of proximity to a non-serving cell on the unlicensed frequency; and receive from the radio terminal, on the licensed frequency, a result of the detection performed by the radio terminal in response to the notification.

In a third aspect, a method performed in a radio terminal includes: (a) communicating with a radio station on a licensed frequency; (b) receiving from the radio station, on the licensed frequency, a notification regarding detection of proximity to a non-serving cell on an unlicensed frequency; (c) activating a function of the detection in the radio terminal in response to receiving the notification; and (d) reporting a result of the detection to the radio station on the licensed frequency.

In a fourth aspect, a radio terminal includes a radio communication unit (a transceiver) and a control unit (a controller). The radio communication unit is configured to communicate with a radio station on a licensed frequency and an unlicensed frequency. The control unit is configured to: receive from the radio station, on the licensed frequency, a notification regarding detection of proximity to a non-serving cell on the unlicensed frequency; activate a function of the detection in response to the reception of the notification; and report a result of the detection to the radio station on the licensed frequency.

In a fifth aspect, a program includes instructions (software codes) that, when loaded into a computer, causes the computer to perform the method according to the aforementioned first aspect.

In a sixth aspect, a program includes instructions (software codes) that, when loaded into a computer, causes the computer to perform the method according to the aforementioned third aspect.

Advantageous Effects of Invention

According to the aforementioned aspects, it is possible to provide an apparatus, a method, and a program that contribute to acquisition of information useful for a radio station (e.g., an eNB) to determine whether to allow a radio terminal (e.g., a UE) to perform communication (in a cell) on the unlicensed frequency.

BRIEF DESCRIPTION OF DRAWINGS

FIG. 5 is a diagram showing one example of a notification transmitted from the radio base station regarding the detection of proximity to the non-serving cell on an unlicensed frequency (Proximity Configuration);

FIG. 6 is a diagram showing one example of a report regarding a result of the detection of proximity to the non-serving cell on the unlicensed frequency transmitted by the radio terminal (Proximity Indication);

DESCRIPTION OF EMBODIMENTS

Figure 1A:
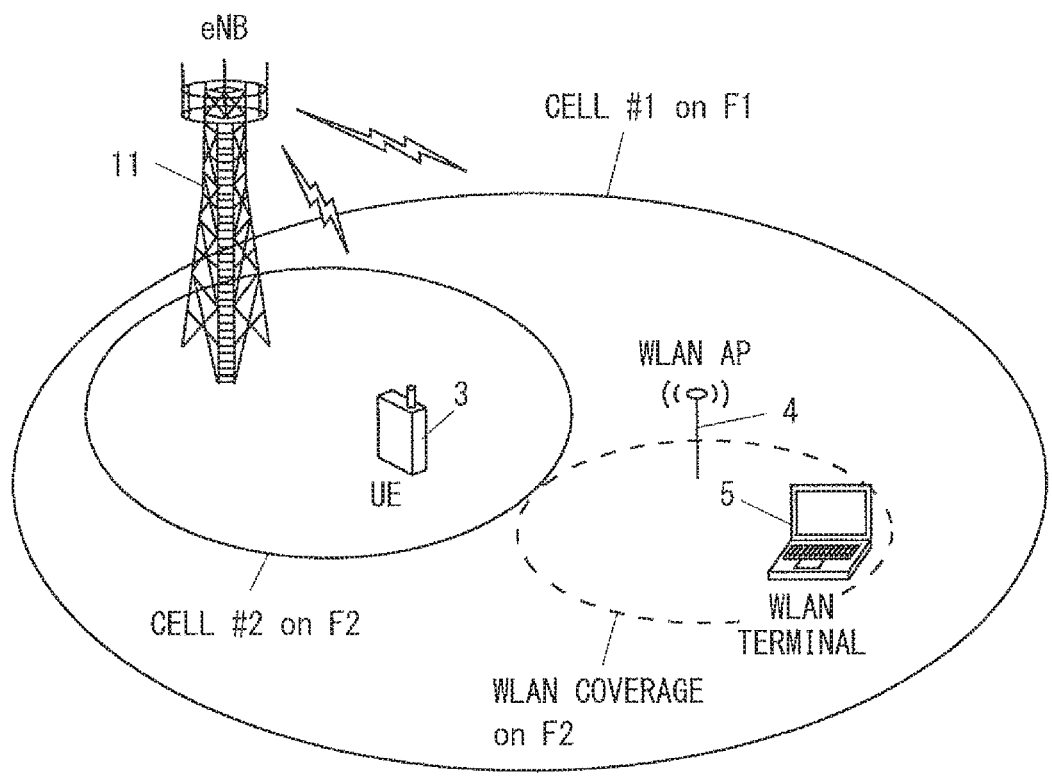
FIG. 1A is a diagram showing a configuration example of a radio communication system and another radio system according to several embodiments.

Specific embodiments are explained hereinafter in detail with reference to the drawings. In the drawings, the same or corresponding elements are denoted by the same reference signs, and repetitive descriptions will be avoided as necessary for clarity of explanation.

Embodiments described below will be explained mainly using specific examples with regard to an Evolved Packet System (EPS) that contains LTE and System Architecture Evolution (SAE). However, these embodiments are not limited to being applied to the EPS and may also be applied to other mobile communication networks or systems such as a 3GPP Universal Mobile Telecommunications System (UMTS), a 3G-PP2 CDMA2000 system (1×RTT, HRPD (High Rate Packet Data)), a global system for mobile communications (GSM (registered trademark))/General packet radio service (GPRS) system, and a WiMAX system.

First Embodiment

First, some examples of Unlicensed LTE using an unlicensed frequency (Unlicensed frequency band, Unlicensed spectrum) according to a plurality of embodiments including this embodiment will be described. The Unlicensed LTE is also referred to as LTE-U or U-LTE and is hereinafter referred to as LTE-U. The unlicensed frequency includes a frequency that is used for, for example, radar systems and wireless LAN (WLAN or also referred to as WiFi) and includes frequencies other than licensed frequencies allocated only to any specific operators (i.e., service providers). The unlicensed frequency is, for example, but not limited to, 5 GHz band. Further, the plurality of embodiments described below can also be applied to a shared frequency (Shared frequency band, Shared spectrum) commonly allocated to a plurality of operators. In the following description, frequencies other than licensed frequencies are collectively referred to as the unlicensed frequency.

Figure 1B:
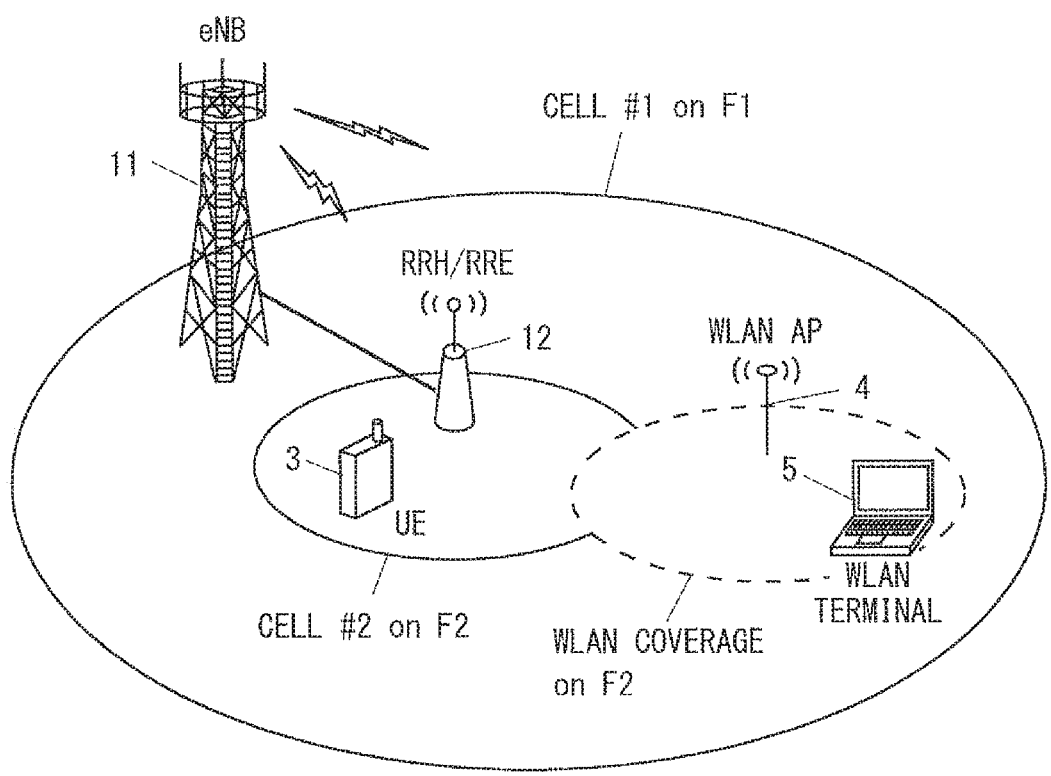
FIG. 1B is a diagram showing a configuration example of the radio communication system and the other radio system according to several embodiments.
Figure 2:
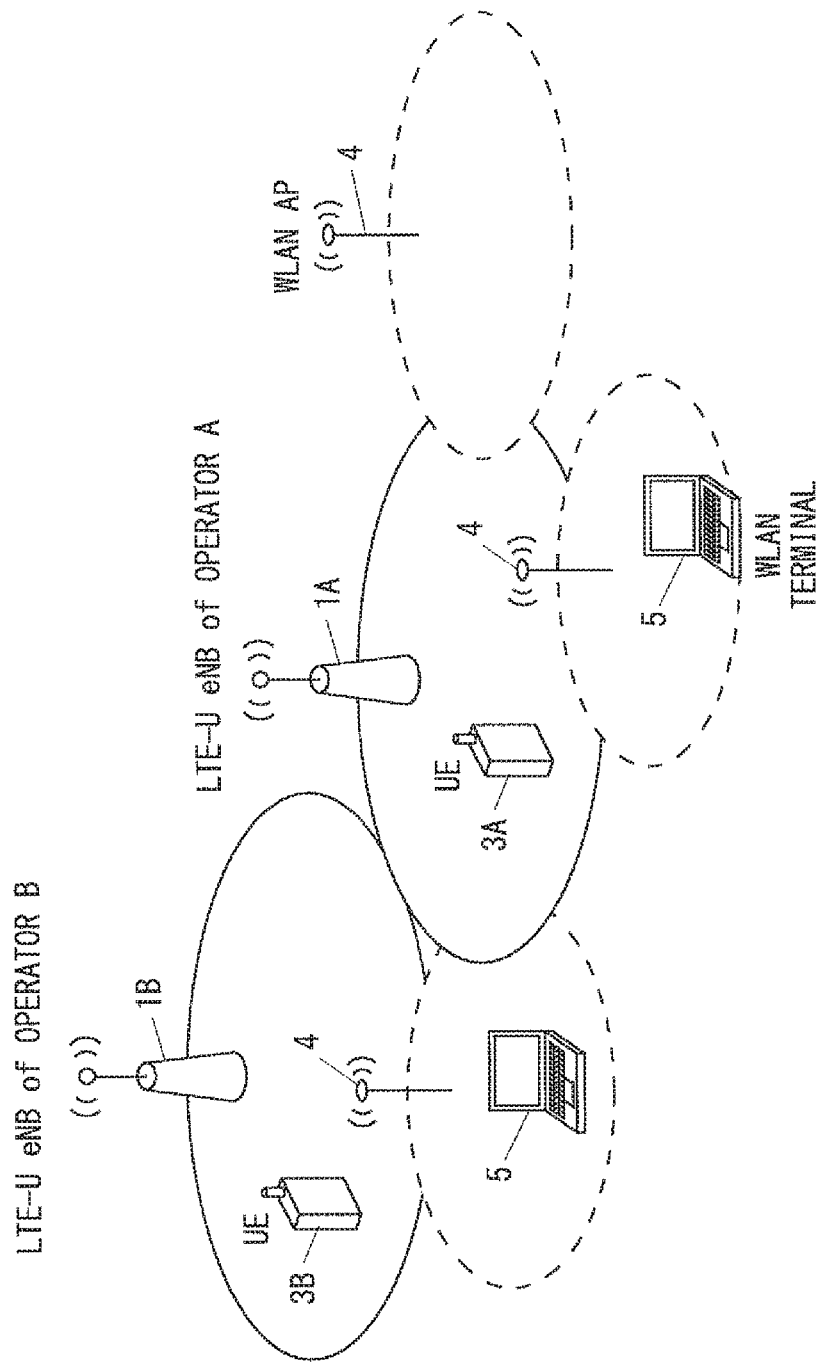
FIG. 2 is a diagram showing a configuration example of the radio communication system and the other radio system according to several embodiments.

FIGS. 1A, 1B, and 2 are diagrams each showing a configuration example of a radio communication system of LTE-U and another system according to the plurality of embodiments including this embodiment. In the example shown in FIG. 1A, the radio communication system includes a radio base station of LTE (eNB) 11 and a radio terminal (UE) 3. The eNB 11 and the UE 3 are configured to perform communication according to normal LTE on a licensed frequency (F1) and to perform communication according to LTE-U on an unlicensed frequency (F2). On the other hand, the unlicensed frequency (F2) is used for communication between a wireless LAN access point (WLAN AP) 4 and a wireless LAN terminal (WLAN Terminal) 5 as well. Besides the example shown in FIG. 1A, in the example shown in FIG. 1B, the LTE eNB 11 manages a remote base station 12 (RRH or RRE) and uses the remote base station 12 to perform communication according to LTE-U on the unlicensed frequency (F2).

The configuration shown in FIG. 1A and that shown in FIG. 1B may coexist in the same system. Further, FIGS. 1A and 1B show only a part of the radio communication system that is considered in this example. In reality, there are a plurality of eNBs and their RRHs/RREs and a plurality of UEs around the eNB 11, the RRH/RRE 12, and the UE 3, and a plurality of cells on the licensed frequency are managed by these eNBs and RRHs/RREs. Further, there may be a plurality of WLAN APs and a plurality of WLAN Terminals around the eNB 11, the RRH/RRE 12, and the UE 3. In the following description, the term "radio base station 1" or "LTE-U eNB 1" is used to indicate any eNB having the function of LTE-U. That is, the radio base station 1 or the LTE-U eNB 1 corresponds to the eNB 11 in the configuration shown in FIG. 1A and corresponds to the eNB 11 and the RRH/RRE 12 in the configuration shown in FIG. 1B. For the sake of convenience of explanation, only a node corresponding to the RRH/RRE 12 in the configuration shown in FIG. 1B may be referred to as the radio base station 1 or the LTE-U eNB 1.

FIG. 2 is a configuration example of the radio communication system of LTE-U and another radio communication system when the unlicensed frequency is particularly noted. There are a radio base station (LTE-U eNB-A) 1A having the function of LTE-U of one operator (service provider) A and a radio terminal (UE for Operator A; UE-A) 3A capable of being connected to a network of the operator A. There also are a radio base station (LTE-U eNB-B) 1B having the function of LTE-U of another operator (service provider) B and a radio terminal (UE for Operator B; UE-B) 3B capable of being connected to a network of the operator B. Each of the LTE-U eNBs 1A and 1B corresponds to, for example, the eNB 11 and the RRH/RRE 12 in FIGS. 1A and 1B and is also referred to as an LTE-U AP, which means an access point of LTE-U. Further, similar to FIGS. 1A and 1B, there are WLAN APs 4 and WLAN Terminals 5 around the LTE-U eNBs 1A and 1B and the UEs 3A and 3B.

In the aforementioned description and the following description, it is assumed that LTE-U is implemented using LAA (also referred to as LA-LTE). As already stated above, in LAA, the radio base station (LTE-U eNB) 1 and the radio terminal (UE) 3 perform carrier aggregation (CA) of a cell on the licensed frequency and a cell on the unlicensed frequency, use the cell on the licensed frequency as a primary cell (PCell), and use the cell on the unlicensed frequency as a secondary cell (SCell). As already stated above, LTE-U may be executed using a shared frequency (Shared frequency band, Shared spectrum) allocated to a plurality of operators (service providers) instead of using the unlicensed frequency. In this case, LTE-U may be achieved by the aforementioned LAA or a scheme similar to LAA. Alternatively, the LTE-U eNB 1 and the UE 3 may perform CA using a plurality of shared frequencies (e.g., two frequencies F3 and F4), and execute normal LTE in a PCell on one of two shared frequencies (F3) and execute LTE-U in a SCell on the other shared frequency (F4). As already stated above, LTE-U using a shared frequency is specifically referred to as Licensed Shared Access (LSA). Furthermore, the LTE-U eNB 1 and the UE 3 may perform CA using a shared frequency allocated to a plurality of operators (e.g., F3) and an unlicensed frequency in a narrow sense that is not allocated to any operator (e.g., F2 (e.g., 5 GHz band)), and execute normal LTE in a PCell on the shared frequency (F3) and execute LTE-U in a SCell on the unlicensed frequency in a narrow sense (F2).

Further, in the plurality of embodiments including this embodiment, it is assumed that communication on the unlicensed frequency (or the shared frequency) executed in LTE-U is basically downlink data transmission from the radio base station 1 to the radio terminal 3 in order to simplify explanation. Needless to say, however, communication on the unlicensed frequency (or the shared frequency) according to LTE-U can be applied also to uplink data transmission from the radio terminal 3 to the radio base station 1. Further, when the communication between the radio base station 1 and the radio terminal 3 on the unlicensed frequency can be performed only in the downlink, in LAA using the unlicensed frequency as the secondary cell (SCell), the unlicensed frequency does not substantially serve as a separate cell and only serves as a downlink secondary carrier (Secondary Component Carrier: SCC). In the plurality of embodiments including this embodiment, however, explanation will be basically given without considering whether the unlicensed frequency serves as a separate cell on its own and a supplementary explanation will be given as necessary.

Figure 3:
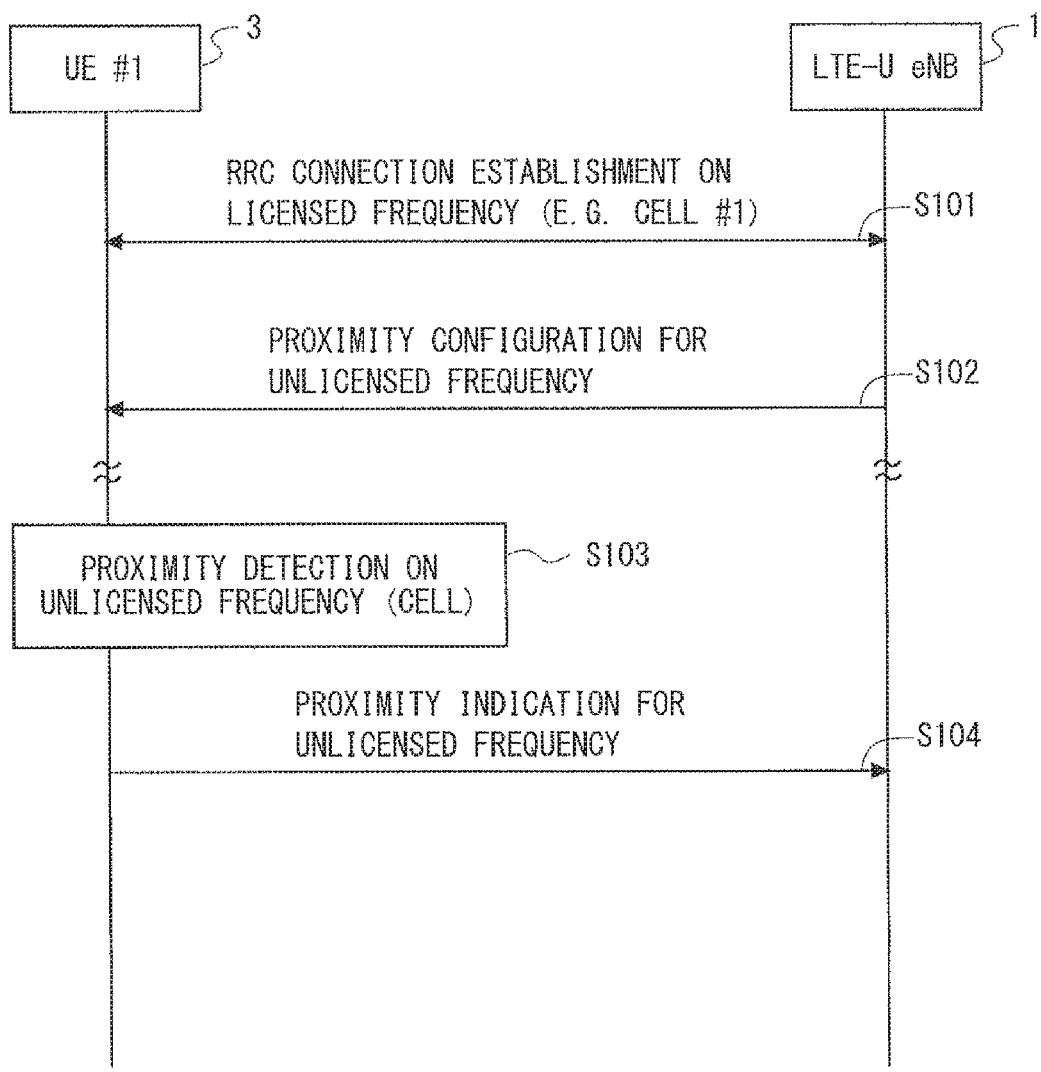
FIG. 3 is a sequence diagram showing one example of operations of a radio base station and a radio terminal according to a first embodiment.

FIG. 3 is a sequence diagram showing operations of the radio base station (LTE-U eNB) 1 and the radio terminal (UE) 3 according to the first embodiment. The radio terminal 3 is denoted as "UE #1" in FIG. 3. In FIG. 3, it is assumed that the LTE-U eNB 1 manages a cell (Cell #1) on the licensed frequency (F1) and a cell (Cell #2) on the unlicensed frequency (F2).

In FIG. 3, the UE 3 first establishes a radio connection with the LTE-U eNB 1 in the Cell #1, which is the serving cell (RRC Connection Establishment, S101), and further establishes a bearer (e.g., EPS bearer, E-RAB) with a core network (EPC) (not shown). Then, the UE 3 enters a state in which, for example, the UE 3 can transmit and receive user data (not shown). The LTE-U eNB 1 transmits to the UE 3 a notification regarding detection of proximity to the cell on the unlicensed frequency (e.g., F2) (Proximity configuration for unlicensed frequency, S102). While the following description will be given assuming a case in which the cell on the unlicensed frequency is a non-serving cell for the UE 3, the cell on the unlicensed frequency may be a serving cell (or a configured cell).

The notification regarding the detection of proximity to the cell on the unlicensed frequency includes, for example, at least one of: information regarding one or more unlicensed frequencies on which the proximity detection is to be performed; and information regarding cell(s) on the unlicensed frequency(ies). The information regarding the unlicensed frequency(ies) may include, for example, one or any combination of the following elements:

a frequency identifier of LTE (e.g., E-UTRA Absolute Radio Frequency Channel Number (EARFCN));
   an unlicensed frequency identifier (e.g., an Unlicensed frequency index); and
   a (center) frequency (e.g., a carrier frequency).

The unlicensed frequency identifier may be defined as a number or an index newly added to an unlicensed frequency that is available for LTE-U.

The information regarding the cell(s) on an unlicensed frequency(ies) may include, for example, one or any combination of the following elements:

a cell identifier (e.g., a Physical Cell Identifier (PCI), an EUTRAN Cell Global ID (ECGI), or a Virtual Cell ID); and
   an unlicensed frequency cell identifier (e.g., an Unlicensed Cell ID).

The Virtual Cell ID may be, for example, a scrambling code identifier (e.g., a Scrambling Identity or a Scrambling Code ID) used to transmit a reference signal or another signal in the cell on the unlicensed frequency. The unlicensed frequency cell identifier may be defined as a cell number or a cell index newly added to a cell on an unlicensed frequency.

Furthermore, this notification may include another network identifier (e.g., a Public Land Mobile Network Identifier (PLMN ID), a Tracking Area Identity (TAI), or a Tracking Area Code (TAC)). When this notification includes these network identifiers, the radio terminal 3 may use the specified network identifiers to differentiate cell(s) to which the proximity of the radio terminal 3 is to be detected from other cells.

Further, the notification regarding the detection of proximity to the cell on the unlicensed frequency may include information regarding a period allowed for allocation of the unlicensed frequency to LTE-U. The information regarding the period allowed for allocation may include, for example, one or both a Duty Cycle Period (e.g., in millisecond (ms)) a Duty Cycle (e.g., in percent (%)). The Duty Cycle Period is the reference period to define the period allowed for allocation. The Duty Cycle indicates the rate of the period allowed for allocation in the reference period. When the Duty Cycle Period is 200 ms and the Duty Cycle is 50%, for example, it may be considered that the period allowed for allocation to LTE-U of 100 ms is provided for every 200 ms. The values of the Duty Cycle Period and the Duty Cycle may be defined, for example, in advance in the specification, or may be sent from a control apparatus (e.g., a Mobility Management Entity (MME) or an Operation, Administration and Maintenance (OAM) entity) to the radio base station I. Otherwise, the radio base station 1 itself may determine the Duty Cycle Period and the Duty Cycle as appropriate based on the result of sensing or the like.

Referring once again to FIG. 3, the explanation will be continued. Upon receiving the notification sent in S102 (i.e., in response to the notification), the UE 3 attempts to detect proximity to a non-serving cell on the unlicensed frequency (i.e., enables (activates) the detection function) (S103). When the UE 3 has successfully detected a non-serving cell on the unlicensed frequency (Proximity detection on unlicensed frequency (cell)), the UE 3 reports the result of the detection to the LTE-U eNB (Proximity indication for unlicensed frequency, S104).

The result of the detection of proximity to a cell(s) on the unlicensed frequency(ies) reported from the UE 3 includes, for example, at least one of: information regarding one or more unlicensed frequencies on which the proximity has been detected and information regarding the cell(s) on the unlicensed frequency(ies). Further, the result transmitted from the UE 3 may include another network identifier transmitted in the cell(s) on the unlicensed frequency(ies) on which the proximity has been detected. Furthermore, the result transmitted from the UE 3 may include a measurement result of reception quality of a reference signal (RS) in the cell(s) (e.g., RSRP, RSRQ, a Received Signal Strength Indicator (RSSI), a Channel Quality Indicator (CQI), or a Signal-to-Interference-plus-Noise ratio (SINR)).

Based on this report from the UE3, the LTE-U eNB 1 may determine whether to allow the UE 3 to perform communication (LTE-U) in the cell on the unlicensed frequency. Alternatively, the LTE-U eNB 1 may further instruct the UE 3 to perform a terminal measurement in the cell and then determine whether to allow the UE 3 to perform communication (LTE-U) in the cell based on the terminal measurement report from the UE 3. In the former case, it is possible not only to reduce the amount of signaling that is necessary for the procedure of the terminal measurement report but also to execute the determination more dynamically. On the other hand, in the latter case, it is possible to prevent an increase in the amount of signaling occurring due to random transmission of the instructions for the terminal measurement report (i.e., random selection of radio terminals in the cell on the licensed frequency) and an increase in the load of radio terminals (e.g., an increase in the power consumption).

Further, by instructing the UE 3 to perform not only the detection of the proximity to the cell but also the terminal measurement for a predetermined period, it can be expected that the accuracy of the determination is improved.

Accordingly, the radio base station (LTE-U eNB) 1 can use the result of the detection of the proximity reported from the radio terminal (UE) 3, whereby it is possible to appropriately determine the radio terminal (UE) 3 that is allowed to perform LTE-U in the cell on the unlicensed frequency. The procedure shown in FIG. 3 is especially effective when the operation state of the cell on the unlicensed frequency is dynamically changed, that is, when On/Off of the cell is aperiodically switched.

The detection of proximity to the non-serving cell on the unlicensed frequency by the radio terminal (UE) 3 includes, for example, detection of a cell-specific signal transmitted from the radio base station (LTE-U eNB) 1 in the non-serving cell. The cell-specific signal contains a known symbol or a known sequence. The cell-specific signal may be, for example, a synchronization signal (in LTE, the synchronization signal includes a Primary SS (PSS) and a Secondary SS (SSS)), a reference signal (RS), or basic information (Master Information Block (MIB)) or system information (System Information Block (SIB), e.g., SIB1, SIB2, or SIBx defined for LTE-U) broadcasted in the cell. In this case, the radio terminal 3 may detect proximity to the non-serving cell based on, for example, whether the reception quality (e.g., RSRP, RSRQ, RSSI, SINR, or CQI) of the cell-specific signal (e.g., RS) is equal to or larger than a predetermined threshold (or larger than the threshold). Instead, the radio terminal 3 may detect proximity to the non-serving cell based on whether it has successfully received the basic information (MIB) or the system information (SIB) broadcasted in the non-serving cell. The reference signal may include, for example, at least one of a cell specific reference signal (Cell Specific RS (CRS)), a reference signal (CSI RS) for a measurement report regarding channel state information (CSI), and a reference signal for cell detection (Discovery RS (DRS)). The DRS may be a combination of two or more of the PSS, the SSS, the CRS, and the CSI RS, or may be a new reference signal defined for the cell detection.

Further, the notification regarding the detection of proximity to the cell on the unlicensed frequency may include a condition(s) (event(s)) regarding the detection of proximity to the cell. That is, when the condition(s) (event(s)) is satisfied, it may be determined that the radio terminal 3 has detected proximity to the cell. The condition(s) (event(s)) may be, for example, one or any combination of the following conditions:
  (the quality of) the cell on the unlicensed frequency becomes better than a threshold 1;
  (the quality of) the cell on the unlicensed frequency becomes better than the PCell by an offset 1; and
  (the quality of) the cell on the unlicensed frequency becomes better than the SCell by an offset 2.

It may be considered that (the quality of) the cell on the unlicensed frequency being good corresponds to, for example, reception quality of a reference signal of the cell being good or predetermined quality of the cell being good.

When the radio terminal (UE) 3 has received, from the radio base station (LTE-U eNB) 1, the notification regarding the detection of proximity to the cell on the unlicensed frequency, the radio terminal (UE) 3 may consider that it has been configured to perform detection on the unlicensed frequency (i.e., UE considers itself to be configured to perform proximity check for unlicensed frequency), or consider that it has been configured to transmit a notification (proximity indication) indicating that the proximity to the cell in the unlicensed frequency has been detected (i.e., UE considers itself to be configured to provide proximity indication for unlicensed frequency). The "proximity check" is also referred to as "proximity estimation". Further, the radio base station (LTE-U eNB) 1 may explicitly instruct the radio terminal (UE) 3 to perform the detection by this notification or may implicitly instruct the radio terminal (UE) 3 to perform the detection by including, in this notification, information regarding the unlicensed frequency to be detected or information regarding the cell on the unlicensed frequency.

Further, the radio base station (LTE-U eNB) 1 may receive, from the radio terminal (UE) 3, prior to the transmission of the notification regarding the detection of the proximity (S102 in FIG. 3), capability information indicating that the radio terminal (UE) 3 has a function regarding the detection of proximity (to the cell) on the unlicensed frequency (capability of proximity to unlicensed frequency cell). The radio terminal (UE) 3 may transmit the capability information, for example, in a procedure for establishing the radio connection (RRC Connection Establishment procedure) or in a procedure for modifying the radio connection (RRC Connection reconfiguration procedure). Alternatively, the radio terminal (UE) 3 may transmit a terminal capability report (UECapabilityInformation message) including the capability information, in response to a terminal capability report request (UECapabilityEnquiry message) from the radio base station (LTE-U eNB) 1. The radio terminal (UE) 3 may report, to the radio base station (LTE-U eNB) 1, the "UE-EUTRA-Capability" IE including a newly defined "UnlicensedFreqProximityIndication" in which the corresponding flag is set to "supported", so as to indicate that the radio terminal (UE) 3 has the function regarding the detection of proximity (to the cell) on the unlicensed frequency. Then the radio base station (LTE-U eNB) 1 may transmit the notification regarding the detection of the proximity to only the radio terminal(s) (UE(s)) 3 that has reported the capability information. In this case, the notification regarding the detection of the proximity may be transmitted using a dedicated control signal (Dedicated RRC signaling) for the radio terminal(s) (UE(s)) 3 that has reported the capability information.

Alternatively, the radio base station 1 may broadcast the notification regarding the detection of the proximity in system information in a cell that the radio base station 1 manages (i.e., the serving cell (e.g., PCell) of the radio terminal 3). The radio base station 1 may transmit the notification regarding the detection of the proximity using, for example, SIB1, SIB2, or SIBy defined for LTE-U. In this case, upon receiving the system information (i.e., in response to the system information), the radio terminal 3 that has the function of detecting proximity to the cell on the unlicensed frequency may start (attempt) the detection of the proximity.

While the detection of proximity to a cell means that the radio terminal 3 detects that it has come into the vicinity (area, region) of one or more cells on the target unlicensed frequency, a case in which the radio terminal 3 has already been in the vicinity of the cell before the detection of proximity to the cell is started (attempted) is also included within the scope of this embodiment. Further, the detection of proximity to a cell may be thought of as being (considered to be) an estimation of proximity to a cell, detection of availability of a cell, or simply detection (discovery) of a cell. While the following explanation will be given using the term "proximity to a cell" as an example, similar explanations will be applied to an estimation of proximity to a cell, detection of availability of a cell, or detection of a cell.

Further, the notification indicating the detection of proximity to the cell on the unlicensed frequency may include, in a broad sense, a notification indicating detection that the radio terminal (UE) 3 moves away from the cell on the unlicensed frequency. The radio terminal 3 may detect that it has moved away from the cell on the unlicensed frequency based on determining that it cannot detect a cell-specific signal transmitted from the radio base station in the cell any more. In this case, the radio terminal 3 may detect that it moves away from the cell based on, for example, whether the reception quality of the cell-specific signal is equal to or smaller than a predetermined threshold (or smaller than the threshold). Instead, the radio terminal 3 may detect that it moves away from the cell based on whether it can successfully receive the basic information (MIB) or the system information (SIB) broadcasted in the cell. Further, one or any combination of the following conditions may be added to the aforementioned condition (event):

(the quality of) the cell on the unlicensed frequency becomes worse than a threshold 2;

(the quality of) the cell on the unlicensed frequency becomes worse than the PCell by an offset 3; and (the quality of) the cell on the unlicensed frequency becomes worse than the SCell by an offset 4.

It can be considered that (the quality of) the cell on the unlicensed frequency being bad corresponds to, for example, reception quality of a reference signal in the cell being bad or predetermined quality of the cell being bad.

As described above, by detecting that the radio terminal 3 moves away from the cell on the unlicensed frequency and reporting the result of the detection to the radio base station 1, the radio base station 1 can more appropriately make determination regarding whether to allow the radio terminal 3 to perform communication in the cell on the unlicensed frequency.

Specific Example 1

In a specific example 1 according to the first embodiment, with reference to a flowchart shown in FIG. 4, a procedure performed by the radio terminal (UE) 3 for detecting proximity to the non-serving cell on the unlicensed frequency will be described. First, the radio terminal (UE) 3 receives from the radio base station (LTE-U eNB) the notification regarding the detection of proximity to the cell on the unlicensed frequency and activates the function of the detection (Receive proximity configuration for unlicensed frequency, S201). This notification includes information regarding the unlicensed frequency or information regarding the cell on the unlicensed frequency.

The UE 3 checks whether discontinuous reception (DRX) has been configured in the serving cell (DRX has been configured?, S202). When the discontinuous reception has been configured (Yes), the UE 3 further determines whether the configuration of the DRX is sufficient for the detection (DRX is sufficient for proximity check?, S203). When the configuration of the DRX is sufficient for the detection (Yes), the UE 3 attempts the detection in a non-reception period of the DRX (also referred to as a sleep period) (Proximity check for unlicensed frequency with DRX, S204). On the other hand, when the DRX has not been configured (No) or when the configuration of the DRX is not sufficient for the detection (No), the UE 3 attempts the detection using an autonomous search function (Proximity check for unlicensed frequency with autonomous search function, S205). The autonomous search function includes, for example, configuring an autonomous gap, suspending communication in the serving cell (in particular, reception of the downlink signal) in a predetermined timing (and in a predetermined period), and monitoring another serving cell(s) or a non-serving cell(s) (e.g., performing the cell detection and the terminal measurement). In Step S205, the UE 3 attempts to detect the non-serving cell on the unlicensed frequency using the autonomous search function while the communication in the serving cell is being suspended.

Then the UE 3 determines whether the cell has been detected on the unlicensed frequency (Any cell is detected on unlicensed frequency?, S206). When the cell has been detected (Yes), the UE 3 sends a notification indicating that the cell has been detected as the result of the detection (Send proximity indication for unlicensed frequency, S207). When the cell has not been detected on the unlicensed frequency (No), the LTE determines whether the condition regarding the suspension of the detection has been satisfied (Abort condition has been met?, S208). When the condition has been satisfied (Yes), the UE 3 ends the detection of the proximity to the cell on the unlicensed frequency. When the condition has not been satisfied (No), the UE 3 repeats the same processing. The condition regarding the suspension of the detection of proximity to the cell on the unlicensed frequency may be, for example, that the UE 3 has explicitly notified by the radio base station 1 of a notification instructing the UE 3 to suspend the detection, that the detection has been attempted a predetermined number of times, or that the detection has been attempted for a predetermined period.

Figure 4:
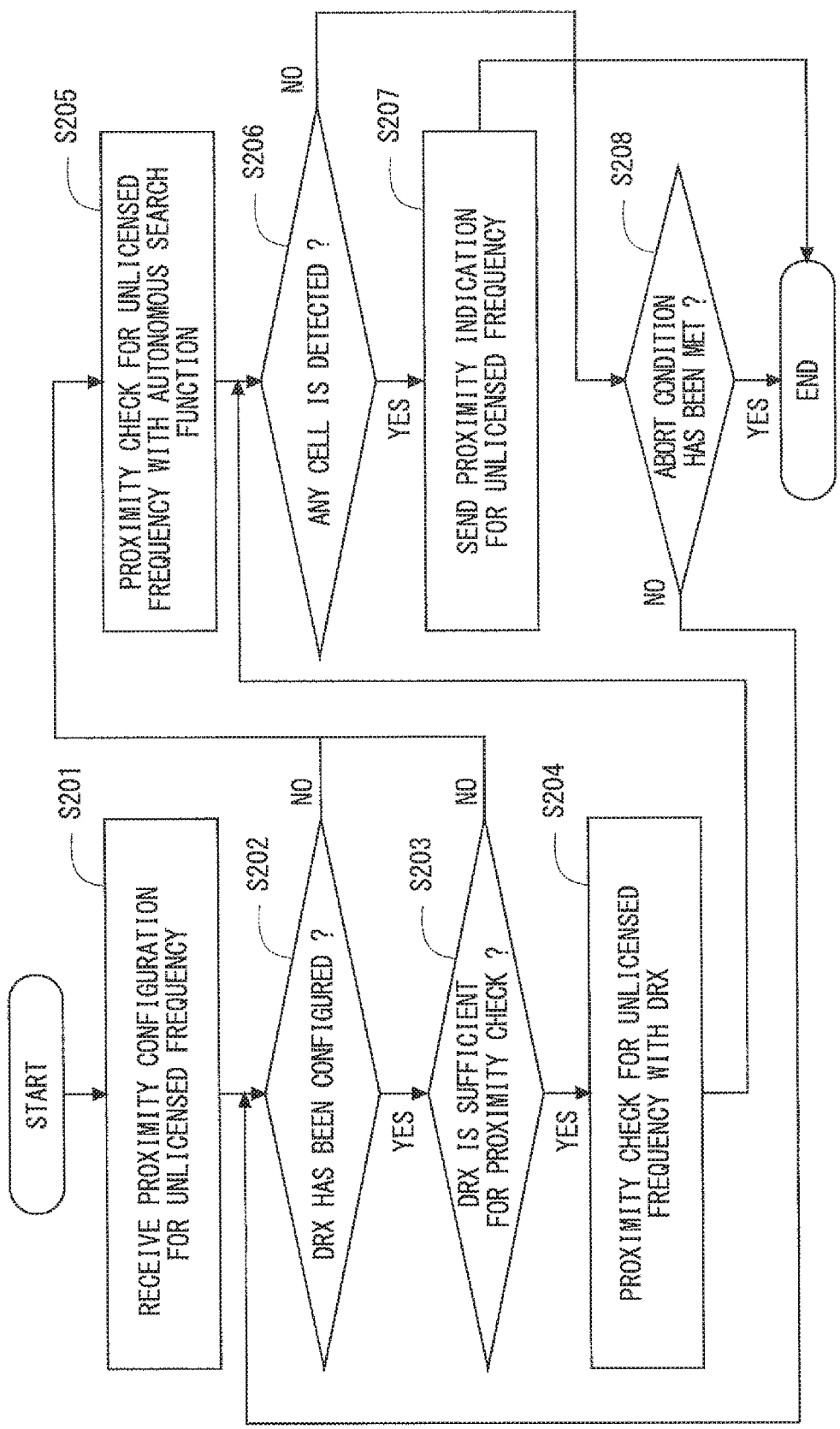
FIG. 4 is a flowchart showing one example of a procedure for detecting proximity to a non-serving cell performed by the radio terminal according to the first embodiment (specific example 1)

While not shown in FIG. 4, the radio terminal (UE) may repeatedly perform the procedure shown in FIG. 4 even after the radio terminal (UE) has reported, to the radio base station (LTE-U eNB), the detection of proximity to the non-serving cell on the unlicensed frequency (proximity indication). In this case, the UE may exclude the unlicensed frequency or the non-serving cell thereon, regarding which the detection has been reported, from the target of the report of the detection for a predetermined period (e.g., several seconds). Further, when the reception quality of the reference signal in the non-serving cell on the unlicensed frequency regarding which the detection has been reported becomes equal to or smaller than a predetermined threshold (or smaller than the threshold), the LTE may report it to the LTE-U eNB.

FIG. 5 shows one example of the notification regarding the detection of proximity to the non-serving cell on the unlicensed frequency transmitted by the radio base station (LTE-U eNB) 1 (i.e., Proximity Configuration). On the other hand, FIG. 6 shows one example of the report regarding the result of the detection of proximity to the non-serving cell on the unlicensed frequency transmitted by the radio terminal (UE) 3 (i.e., Proximity Indication). The suffix "r1x" attached to each of the IEs in FIGS. 5 and 6 corresponds to the release version of the LTE specification and may be specified, for example, by release "1x" (x is any number from 0 to 9).

In FIG. 5, the RRC message corresponding to this notification is an RRC Connection Reconfiguration message and a ReportProximityUnlicensedConfig IE is newly defined as an RRC information element (IE) included therein. This IE transmits, besides information to activate the function of detecting proximity to the cell on the unlicensed frequency (i.e., proximityIndicationUnlicensed is set to "enabled"), information regarding the target unlicensed frequency (i.e., each of "carrierFreq" and "carrierFreq2" is set to a value of ARFCN-ValueEUTRA or a value of ARFCN-Val-ueEUTRA-v9e0). Note that ARFCN-ValueEUTRA/-v0e0 is the information indicating a frequency band defined in EUTRA (LTE). Further, the RRC message may transmit identification information about the cell on the unlicensed frequency (i.e., physCellId is set to any value of "PhysCellId"). Note that PhysCellId is the information indicating a physical cell identifier (PCI) defined in EUTRA (LTE).

Further, the ReportProximityUnlicensedConfig IE may further include information regarding the period allowed for allocation of the unlicensed frequency to LTE-U. The ReportProximityUnlicensedConfig IE may include, for example, one or both of the Duty Cycle Period (dutyCyclePeriod IE: e.g., 5 ms, 10 ms, 15 ms, 20 ms, . . . , 100 ms, 200 ms, 400 ms, 500 ms, . . . ) and the Duty Cycle (dutyCycle IE: e.g., 10, 20, 30, 40, 50, . . . , 90 [%]). The Duty Cycle Period is the reference period to define the period allowed for allocation. The Duty Cycle indicates the rate of the period allowed for allocation in the reference period. The Duty Cycle Period and the Duty Cycle can be used to specify the cycle and the length (duration) of the periodic period allowed for allocation.

In FIG. 6, a ProximityIndicationUnlicensed message is newly defined as the RRC message corresponding to this report. This message includes a ProximityIndicationUnlicensed IE indicating the result of the detection of proximity to the cell on the unlicensed frequency. Further, this IE includes information indicating that the proximity has been detected (i.e., "type" is set to "entering") and information regarding the target unlicensed frequency (carrierFreq). Further, the IE may include cell identification information on the unlicensed frequency (i.e., "physCellId" is set to a value corresponding to the cell that has been detected). The ProximityIndicationUnlicensed IE may be transmitted only when the cell on the unlicensed frequency is detected. In this case, the item "type-r1x" entering) may be omitted in this IE.

Further, the Proximity IndicationUnlicensed IE may include another network identifier transmitted in the cell on the unlicensed frequency that has been detected. This IE may include, for example, one or a plurality of the PLMN ID (e.g., a primary PLMN ID), the TAI, and the TAC. Further, the ProximityIndicationUnlicensed IE may include the reception quality of the reference signal in the cell on the unlicensed frequency that has been detected, for example, the reception quality (e.g., RSRP, RSRQ, RSSI, SINR, or CQI) of the CRS or the reception quality of the CSI-RS.

FIGS. 5 and 6 are each one specific example of this embodiment and the notification (Proximity Configuration) and the report (Proximity Indication) may be implemented by another configuration. For example, ReportProximityUnlicensedConfig in FIG. 5 may be defined as a sub IE of ReportProximityConfig-r9. Further, the proximityIndicationUnlicensed message shown in FIG. 6 may not be defined and a new ProximityIndicationUnlicensed IE may be defined in the existing ProximityIndication message indicating proximity to a closed subscriber group (CSG) cell.

When the radio terminal 3 is equipped with two (or more) receivers (referred to as Dual Receivers or Dual Rx), the radio terminal 3 may skip Steps S202 to S205 in the specific example 1 (FIG. 4) and may start the detection of proximity to the cell on the unlicensed frequency using a receiver that is not used for the communication (LTE) on the licensed frequency.

Second Embodiment

A second embodiment according to the present invention will be described. In this embodiment, after the proximity to the cell on the unlicensed frequency in the first embodiment is reported, the radio base station 1 further instructs the radio terminal 3 to perform the terminal measurement in the cell on the unlicensed frequency and the radio terminal reports the result of the terminal measurement.

Figure 7:
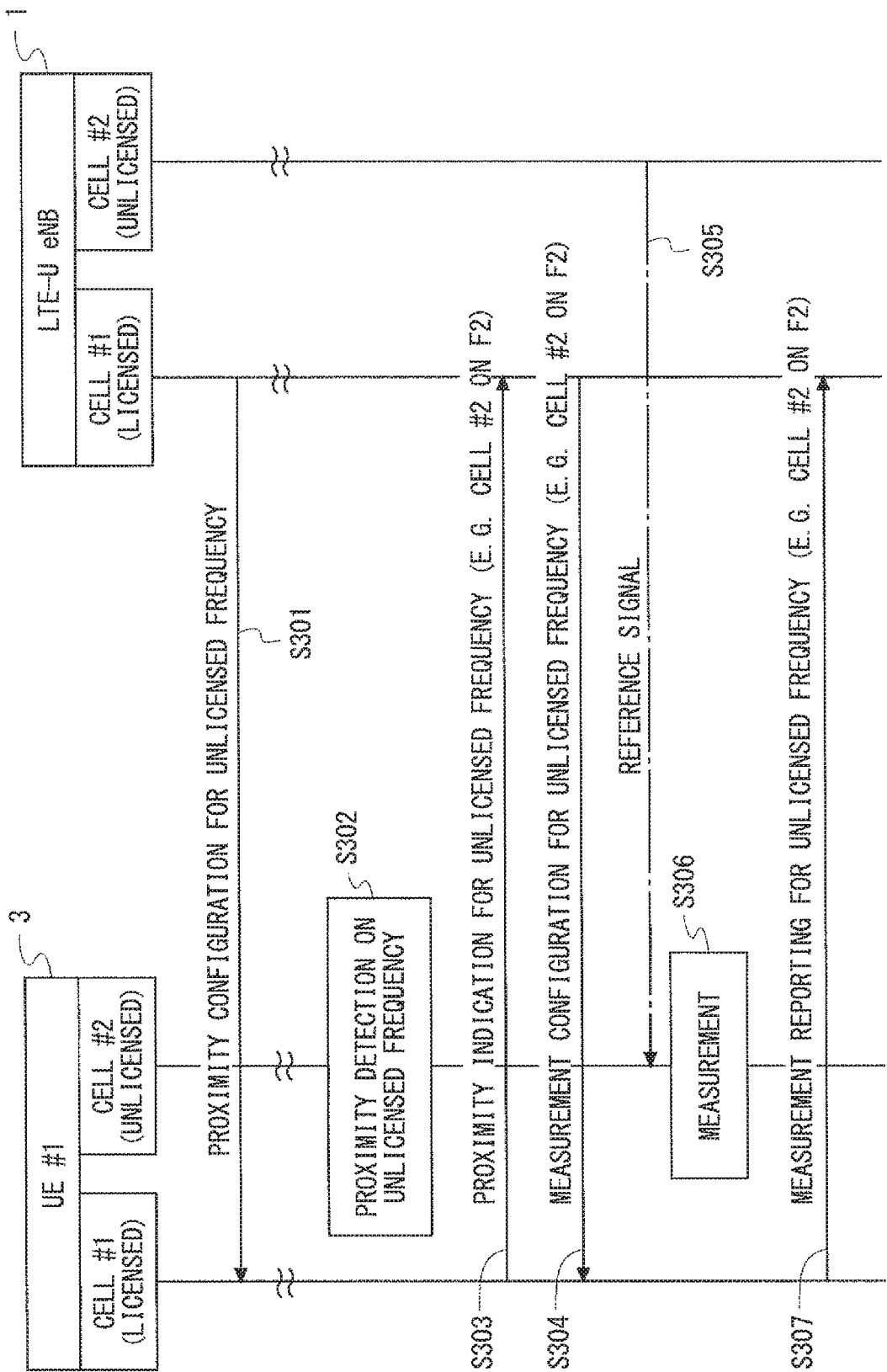
FIG. 7 is a sequence diagram showing one example of operations of a radio base station and a radio terminal according to a second embodiment.

FIG. 7 is a sequence diagram showing operations of the radio base station (LTE-U eNB) 1 and the radio terminal (UE) 3 according to the second embodiment. In FIG. 7, it is assumed that the LTE-U eNB manages a cell (Cell #1) on the licensed frequency (F1) and a cell (Cell #2) on the unlicensed frequency (F2). The radio terminal (UE) 3 is denoted as "UE #1" in FIG. 7.

In FIG. 7, the UE 3 establishes a radio connection with the LTE-U eNB 1 in the Cell #1 (RRC Connection Establishment) and further establishes a bearer (e.g., EPS bearer, E-RAB) with a core network (EPC) (not shown). Then the UE 3 enters a state in which, for example, the UE 3 can transmit and receive user data. The LTE-U eNB 1 transmits to the UE 3, in the Cell #1, the notification regarding the detection of proximity to a non-serving cell on the unlicensed frequency (e.g., F2) (proximity configuration for unlicensed frequency, S301). Upon receiving this notification (i.e., in response to the reception), the UE 3 attempts to detect proximity to the non-serving cell on the unlicensed frequency (i.e., the detection function is activated). When the UE 3 successfully detects the non-serving cell on the unlicensed frequency (Proximity detection on unlicensed frequency, S302), the UE 3 reports the result of the detection to the LTE-U eNB 1 (Proximity indication for unlicensed frequency (e.g., Cell #2 on F2), S303). If the UE 3 cannot identify the cell on the unlicensed frequency in the detection, the UE 3 may report only the information about the unlicensed frequency.

Upon receiving the report from the UE #1, the LTE-U eNB 1 transmits to the UE 3 the configuration information (MeasConfig) regarding the terminal measurement in the cell (e.g., Cell #2) on the unlicensed frequency (e.g., F2) (Measurement configuration for unlicensed frequency (e.g., Cell #2 on F2), S304). If the UE 3 reports only the information about the unlicensed frequency in Step S303, the LTE-U eNB 1 may transmit the configuration information regarding the terminal measurement on the unlicensed frequency without specifying the cell. Then the LTE-U eNB 1 transmits a reference signal (RS) as appropriate in the Cell #2 (S305) and the UE 3 performs the terminal measurement for the reference signal (Measurement, S306) and reports the result of the terminal measurement to the LTE-U eNB (Measurement Reporting for Unlicensed Frequency (e.g., Cell #2 on F2), S307).

The configuration information for the terminal measurement (MeasConfig) includes, for example, at least one of information regarding one or more target unlicensed frequencies and information regarding the cell on the unlicensed frequency. The information regarding the unlicensed frequency(ies) may include, for example, one or any combination of the following elements:

a frequency identifier of LTE (e.g., EARFCN);
an unlicensed frequency identifier (e.g., an Unlicensed frequency index); and
a (center) frequency (e.g., a carrier frequency).

The unlicensed frequency identifier may be defined as a number or an index newly added to an unlicensed frequency that is available for LTE-U.

The information regarding the cell(s) on the unlicensed frequency(ies) may include, for example, one or any combination of the following elements:

a cell identifier (e.g., a PCI, an EUTRAN ECGI, or a Virtual Cell ID); and
an unlicensed frequency cell identifier (e.g., an Unlicensed Cell ID).

The Virtual Cell ID may be, for example, a scrambling code identifier (e.g., a Scrambling Identity or a Scrambling Code ID) used to transmit a reference signal or another signal in the cell on the unlicensed frequency. The unlicensed frequency cell identifier may be defined as a cell number or a cell index newly added to a cell on an unlicensed frequency.

Further, MeasConfig may include another network identifier (e.g., a Public Land Mobile Network Identifier (PLMN ID), a Tracking Area Identity (TAI), or a Tracking Area Code (TAC)). When MeasConfig includes these network identifiers, the radio terminal 3 may perform the terminal measurement in a cell in response to detecting the specified network identifier in this cell.

Furthermore, MeasConfig may include information regarding other system(s) on the unlicensed frequency on which the terminal measurement is to be performed. The information regarding other system(s) may be, for example, a WLAN (Access Point) identifier (e.g., a Service Set Identifier (SSID), a Basic SSID (BSSID), or a Homogenous Extended SSID (HESSID)). When MeasConfig includes the WLAN identifier, the radio terminal 3 may measure reception quality (e.g., a Received Signal Strength Indicator (RSSI), a Received Channel Power Indicator (RCPI), or a Received Signal to Noise Indicator (RSNI)) of a signal from the WLAN in response detecting the specified WLAN identifier on the unlicensed frequency on which the terminal measurement is to be performed, and report the measured reception quality to the radio base station 1.

Accordingly, for example, the radio base station (LTE-U eNB) 1 can appropriately determine the radio terminal (UE) that is allowed to perform LTE-U in the cell on the unlicensed frequency based on the result of the terminal measurement. Note that using the procedure shown in FIG. 7, for example, the radio base station (LTE-U eNB) 1 can determine UE(s) that can contribute to improving throughput by LTE-U based on the result of the detection of proximity to the cell (e.g., Cell 2) on the unlicensed frequency (e.g., F2). Therefore, for example, the radio base station (LTE-U eNB) 1 can selectively cause prospective UE(s) 3 that can contribute to improving throughput by LTE-U to perform the terminal measurement report, which is used for determining whether to allow the radio terminal (UE) 3 to perform LTE-U in the cell on the unlicensed frequency. As a result of this, it is expected to reduce the power consumption and also reduce the control information necessary for the terminal measurement report, regarding the UEs 3 that do not have to send the terminal measurement report. This is especially effective when the operation state of the cell on the unlicensed frequency is dynamically changed, that is, when On/Off of the cell is aperiodically switched.

The instruction for the radio terminal (UE) 3 to perform the terminal measurement sent from the radio base station (LTE-U eNB) 1 may be performed by transmission of the configuration information regarding the terminal measurement (MeasConfig) in the cell on the unlicensed frequency or may be performed by a predetermined control signaling transmitted separately from the configuration information. The predetermined control signaling may be, for example, one of the following three types of signaling:

one or both (L1/L2 signaling) of a Layer 1 (L1) control signal and a Layer 2 (L2) control signal transmitted in a physical downlink control channel (PDCCH);

an L2 control signal (MAC signaling) including control information (MAC Control Element: MAC CE) of a Media Access Control (MAC) layer transmitted in a downlink shared channel (DL-SCH); and the L1/L2 control signal transmitted in the physical downlink control channel (PDCCH) and an L3 control signal (RRC signaling) including control information of an RRC layer transmitted in the DL-SCH.

When the predetermined control signaling is the L1/L2 signaling a U-RNTI (an LTE-U RNTI, a U-LTE, RNTI, or an Unlicensed RNTI), which is one of the identifiers (Radio Network Temporary Identifiers: RNTIs) used for generation and detection of the PDCCH, may be defined in order to transmit the instruction for the terminal measurement (in the cell) on the unlicensed frequency. The L1/L2 signaling may be transmitted using the U-RNTI (i.e., its Cyclic Redundancy Check (CRC) part is scrambled by the U-RNTI). The U-RNTI may be set to a common value for a plurality of radio terminals 3 that are in the radio connected state (RRC_CONNECTED) in a cell on the licensed frequency (e.g., F1) (i.e., radio terminals having the capability of communicating on the unlicensed frequency). In this case, a new PDCCH format (a Downlink Control Information (DCI) format) may be defined. Alternatively, a new physical control channel named "LTE-U PDCCH (U-PDCCH)" may be defined, and this U-PDCCH may be used for transmission of the L1/L2 signaling in place of the PDCCH. The U-PDCCH may be defined, for example, to use a part of the resources for a physical downlink shared data channel (PDSCH). Further, the L1/L2 signaling may explicitly or implicitly indicate one or both of the measurement timing and the measurement period of the terminal measurement. The reception of the L1/L2 signaling by the radio terminal 3 may implicitly indicate the measurement timing. Instead, the L1/L2 signaling may explicitly notify the radio terminal (UE) of the measurement timing or the measurement period.

The information regarding the measurement period includes, for example, the following items:

a combination of a start timing and an end timing of the terminal measurement;

an end timing of the terminal measurement;

a period of the terminal measurement; or information regarding the period allowed for allocation.

The information regarding the period allowed for allocation may include, for example, one or both the Duty Cycle Period (e.g., in millisecond (ms)), which is the reference period to define the period allowed for allocation of the unlicensed frequency to LTE-U, and the Duty Cycle (e.g., in percent (%)), which indicates the rate of the period allowed for allocation in the reference period. The values of the Duty Cycle Period and the Duty Cycle may be defined, for example, in advance in the specification, or may be sent from a control apparatus (e.g., MME or OAM entity) to the radio base station 1. Alternatively, the radio base station 1 itself may determine the Duty Cycle Period and the Duty Cycle based on the result of sensing or the like.

When the predetermined control signaling is the MAC signaling, an Unlicensed Band Measurement MAC CE (or may be another name such as an Unlicensed Frequency Measurement MAC CE, an Unlicensed Spectrum Measurement MAC CE, an LTE-U MAC CE or the like) may be defined to indicate the instruction for the terminal measurement (in the cell) on the unlicensed frequency. Further, a new value of an identifier (Logical Channel Identity: LCID) used for generation and restoration of a MAC Sub header corresponding to the Unlicensed Band Measurement MAC CE may be defined (e.g., LCID Index=11xxx (e.g., 11001) for DL-SCH). When the radio terminal 3 receives the MAC signaling and successfully detects (restores) the Unlicensed Band Measurement MAC CE, the radio terminal 3 may recognize that it has been instructed to perform the terminal measurement (in the cell) on the unlicensed frequency. Further, the Unlicensed Band Measurement MAC CE may include information regarding the measurement period of the terminal measurement.

When the predetermined control signaling is the L1/L2 signaling and the RRC signaling, the radio base station 1 first transmits, besides the configuration information (MeasConfig) that is necessary for the terminal measurement (in the cell) on the unlicensed frequency, configuration information about a terminal measurement gap used for the terminal measurement (Measurement Gap Configuration: MeasGapConfig) to the radio terminal 3 by the RRC signaling in advance. Then the radio base station 1 transmits the L1/L2 signaling to the radio terminal 3 using the U-RNTI in the physical downlink control channel (PDCCH or the aforementioned U-PDCCH) in order to instruct the radio terminal 3 to perform the terminal measurement on the unlicensed frequency (F2). Upon receiving the L1/L2 signaling, the radio terminal 3 executes the terminal measurement (in the cell) on the unlicensed frequency using the terminal measurement gap that has been transmitted in advance. Further, the radio base station 1 may notify the radio terminal 3 of a plurality of MeasGapConfigs (i.e., patterns of the terminal measurement gap) in advance and send the L1/L2 signaling to specify one of the MeasGapConfigs with which the terminal measurement should be executed. Note that MeasConfig may include the information regarding the period allowed for allocation.

However, the radio base station (LTE-U eNB) 1 is not always able to operate LTE (in a cell) on the unlicensed frequency. The LTE-U eNB 1 may check whether the unlicensed frequency is available for LTE-U by sensing or the like and, for example, transmit a synchronization signal and a reference signal (RS) when the unlicensed frequency is available for LTE-U. Therefore, the LTE-U eNB 1 may instruct the UE 3 to perform the terminal measurement in such a way that the terminal measurement by the UE 3 is within the period in which the unlicensed frequency is determined to be available. Further, when it is determined that the unlicensed frequency is available or while the unlicensed frequency is available, the LTE-U eNB 1 may transmit the instruction for the terminal measurement on the unlicensed frequency by a predetermined control signaling. As already stated above, the aforementioned sensing by the LTE-U eNB 1 is also referred to as Listen Before Talk (LBT). This sensing corresponds, for example, to CAC for radar systems or CCA executed by a WLAN AP. The CAC is not required to be executed when the unlicensed frequency to be measured is not a frequency used in radar systems.

Specific Example 2

Figure 8:
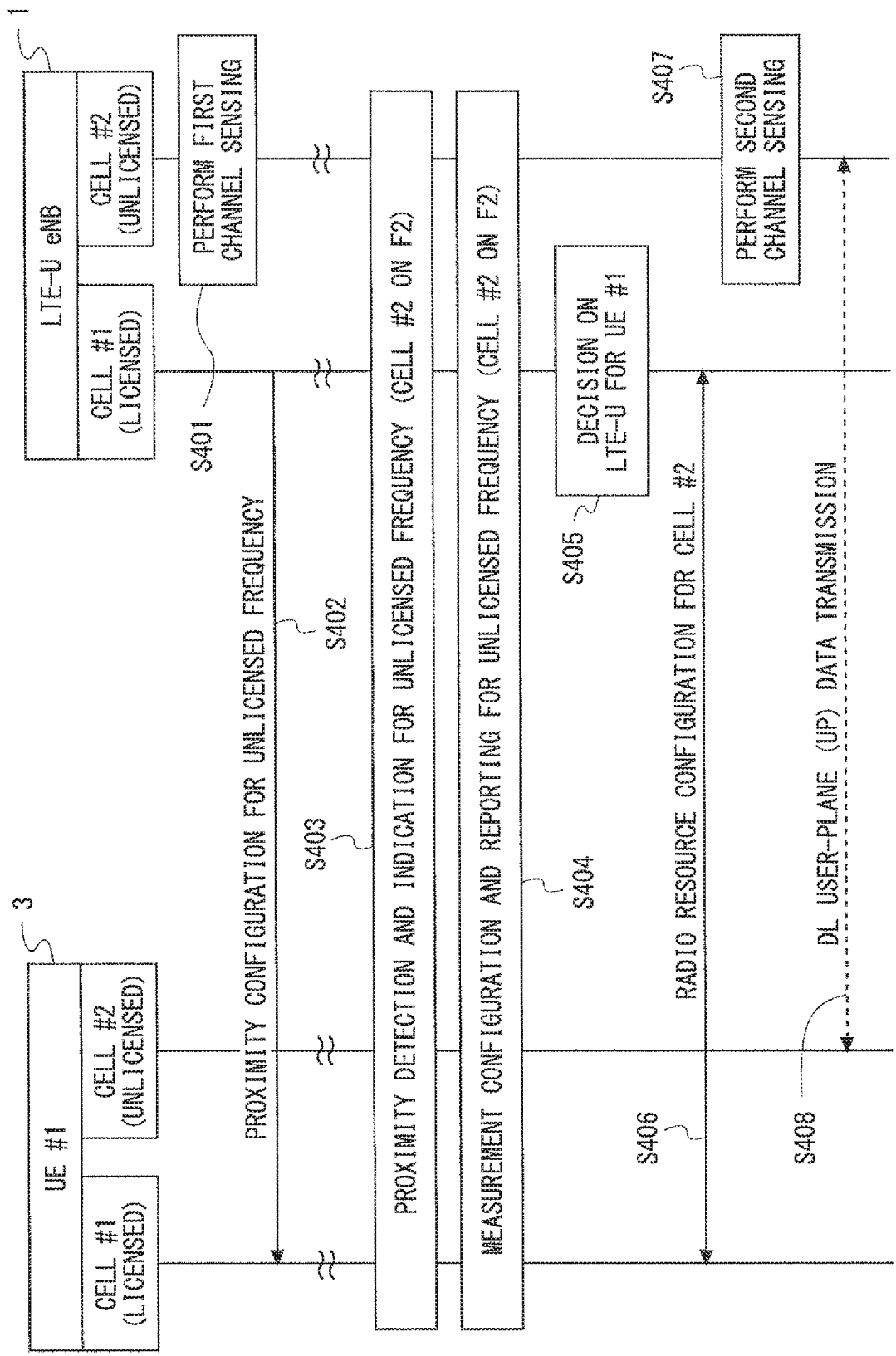
FIG. 8 is a sequence diagram showing one example of the operations of the radio base station and the radio terminal according to the second embodiment (specific example 2)

A specific example 2 according to the second embodiment will be described. FIG. 8 is a sequence diagram showing operations of the radio base station (LTE-U eNB) 1 and the radio terminal (UE) 3 in the specific example 2. The radio terminal (UE) 3 is denoted as "UE #1" in FIG. 7. The case assumed in FIG. 8 is similar to that assumed in FIG. 7: the radio base station (LTE-U eNB) 1 manages a cell (Cell #1) on the licensed frequency (F1) and a cell (Cell #2) on the unlicensed frequency (F2). The LTE-U eNB 1 transmits the notification regarding the detection of proximity to a non-serving cell on the unlicensed frequency (F2) to the UE 3 and the UE 3 attempts the detection. When the detection has been successfully completed, the UE 3 reports the result of the detection to the LTE-U eNB 1. Then the LTE-U eNB 1 instructs the UE 3 to perform the terminal measurement on the unlicensed frequency (F2) and determines, based on the result of the terminal measurement, whether to allow the UE 3 to perform communication by LTE-U (e.g., downlink data transmission) on the unlicensed frequency.

In FIG. 8, the UE 3 first establishes a radio connection with the LTE-U eNB 1 in the Cell #1 (RRC Connection Establishment) and further establishes the bearer (e.g., EPS bearer, E-RAB) with a core network (EPC) (not shown). The LTE-U eNB 1 performs first sensing on the unlicensed frequency (F2) (Perform first channel sensing, S401). The first sensing includes CAC for radar systems, CCA for other systems such as WLAN, CCA for LTE-U served by other operators (service providers), or two of them, or all of them. Upon determining that the unlicensed frequency (F2) is available, the LTE-U eNB 1 transmits to the UE 3 the notification regarding the detection of proximity to the non-serving cell on the unlicensed frequency (proximity configuration for unlicensed frequency, S402). Upon receiving this notification (i.e., in response to the reception), the UE 3 attempts the detection (i.e., activates the detection function). When the UE 3 successfully detects the non-serving cell on the unlicensed frequency, the UE 3 reports the result of the detection to the LTE-U eNB 1 (Proximity Detection and indication for Unlicensed Frequency (Cell #2 on F2), S403).

Upon receiving the report from the UE 3, the LTE-U eNB 1 transmits the configuration information regarding the terminal measurement (MeasConfig) in the cell (Cell #2) on the unlicensed frequency (F2) and the UE 3 performs the terminal measurement and reports the result of the terminal measurement to the LTE-U eNB (Measurement configuration and Reporting for Unlicensed Frequency (Cell #2 on F2), S404). The LTE-U eNB 1 determines whether to perform communication with the UE 3 in the Cell #2 (e.g., downlink data transmission) based on the result of the terminal measurement that has been reported (Decision on LTE-U for UE #1, S405).

The terminal measurement may include, for example, measurement of reception quality of a reference signal (RS) (e.g., RSRP, RSRQ, RSSI, CQI, or SINR). The determination made by the LTE-U eNB 1 may be performed based on whether the value of the reception quality that has been reported is equal to or larger than a predetermined value (or larger than the predetermined value). The reference signal is a generic name for signals whose types and sequences or candidates thereof are known in advance in the radio terminal 3 and is also referred to as a pilot signal. The reference signal in LTE includes, for example, a Cell Specific Reference Signal (CRS) that is different per cell, a Channel State Information (CSI) RS that is used also for a CQI measurement, or a discovery reference signal (DRS) that is used for cell detection.

Further or alternatively, the terminal measurement may include measurement of reception quality (RSSI, Received Channel Power Indicator (RCPI), Received Signal to Noise Indicator (RSNI)) of a predetermined signal defined in other systems such as WLAN (e.g., a reference signal or some or all of the signals transmitted in the frequency of this system). In this case, the determination made by the LTE-U eNB 1 may be performed based on whether the value of the reception quality that has been reported is equal to or smaller than a predetermined value (or smaller than the predetermined value). Alternatively, the UE 3 may perform detection (i.e., attempt to perform detection) of signals of another system such as WLAN by the terminal measurement and report the result of the detection. In this case, the determination made by the LTE-U eNB 1 may be performed based on whether the LTE-U eNB 1 receives the report indicating that other system(s) has been detected.

Further or alternatively, the UE 3 may acquire load information (Basic Service Set (BSS) Load) on other system(s) such as WLAN in the terminal measurement and report the load information. In this case, the determination made by the LTE-U eNB 1 may be performed based on whether the load of the other system is equal to or larger than a predetermined threshold (or larger than the threshold). The LTE-U eNB 1 may determine whether to perform communication with the UE 3 in the Cell #2 based on the aforementioned plurality of results of the terminal measurement.

When the LTE-U eNB 1 determines to perform communication with the UE 3 in the Cell #2, the LTE-U eNB 1 transmits to the UE 3, in the Cell #1, radio resource configuration information regarding the Cell #2 (e.g., RadioResourceConfigCommon and RadioResourceConfigDedicated) (Radio Resource Configuration for Cell #2, S406). In this case, the LTE-U eNB 1 may use, for example, the RRC Connection Reconfiguration message.

The LTE-U eNB 1 then performs second sensing on the unlicensed frequency (F2) (Perform second channel sensing, S407). The second sensing may be the same as, or different from, the first sensing. When the LTE-U eNB 1 determines that the unlicensed frequency (F2) is available, the LTE-U eNB 1 transmits user data (UP data) to the UE 3 in the Cell #2 (S408). In this case, scheduling of the user data (i.e., transmission of information regarding allocation of radio resources) may be performed in the cell (e.g., the Cell #1) on the licensed frequency (e.g., F1) or in the Cell #2. The former scheduling may use the technique referred to as cross-carrier scheduling in LTE.

Using the aforementioned procedure, the radio base station (LTE-U eNB) 1 is able to appropriately determine the radio terminal (UE) 3 that is allowed to perform LTE (LTE-U) on the unlicensed frequency. As a result, it can be expected to improve performance (e.g., system throughput) of the whole LTE radio communication system.

As a method of the terminal measurement in the cell (Cell #2) on the unlicensed frequency (F2), it may be possible to employ the method of using the aforementioned L1/L2 signaling and the RRC signaling. It is needless to say, however, that a method other than the aforementioned method may be used for the terminal measurement.

Figure 9:
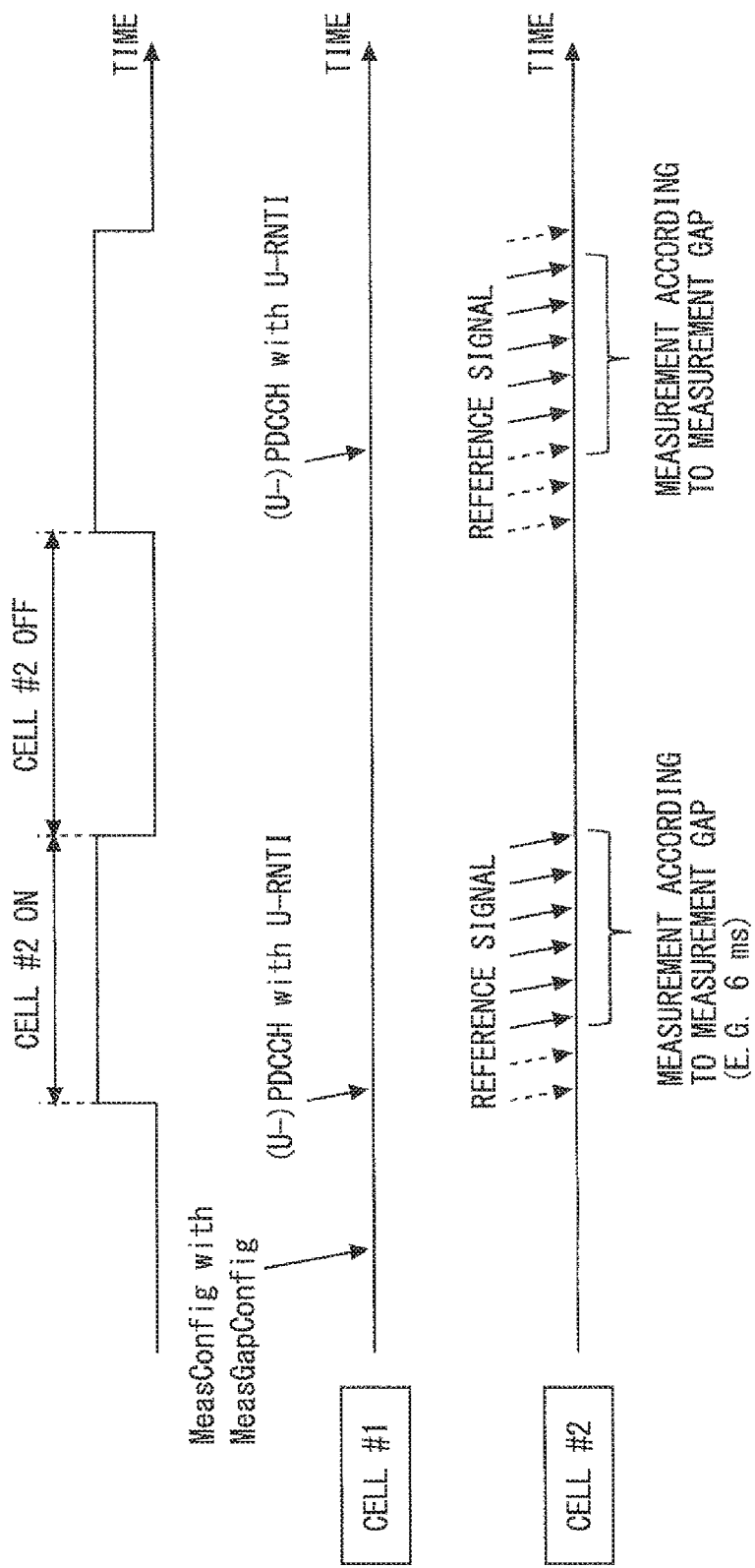
FIG. 9 is a diagram showing one example of a terminal measurement by the radio terminal according to the second embodiment (specific example 2)

FIG. 9 is a diagram for describing the terminal measurement by the radio terminal (UE) 3 in the cell (Cell #2) on the unlicensed frequency (F2) according to the specific example 2. In the specific example 2, the radio base station (LTE-U eNB) 1 dynamically switches the operation state of the Cell #2, that is, dynamically switches ON/Off of the Cell #2, based on the result of the sensing for other systems. The LTE-U eNB 1 first transmits MeasConfig including MeasGapConfig to the UE 3 in the Cell #1 (or another cell on the licensed frequency). When the LTE-U eNB 1 determines that the Cell #2 should be switched on, the LTE-U eNB 1 instructs the UE 3 to perform the terminal measurement in the Cell #2 by transmitting the control signaling (L1/L2 control signal), which is transmitted by (U-) PDCCH using the aforementioned U-RNTI, in the cell (e.g., the Cell #1) on the licensed frequency. Upon receiving the control signaling, the UE 3 performs the terminal measurement in the Cell #2 in accordance with the Measurement Gap specified by the MeasGapConfig.

FIG. 9 shows, as an example, a case in which the length of the terminal measurement gap (Measurement Gap Length) is 6 ms. When the UE 3 receives the L1/L2 signaling ((via U-)PDCCH) and recognizes that it has received the instruction for performing the terminal measurement in the Cell #2, the UE 3 immediately activates the terminal measurement gap and starts the terminal measurement. Then the UE 3 executes the terminal measurement in the Cell #2 for the period of 6 ms in accordance with the Measurement Gap Length. The target of the terminal measurement may be a plurality of cells in one unlicensed frequency (F2) or may be a plurality of cells in a plurality of unlicensed frequencies.

Accordingly, it is possible to dynamically execute the terminal measurement while maintaining the reliability (accuracy) that is necessary for the terminal measurement in the cell (Cell #2) on the unlicensed frequency (F2).

Third Embodiment

A third embodiment according to the present invention will be described. This embodiment provides another operation and another method in the radio terminal (UE) 3 for performing the terminal measurement and the terminal measurement report on the unlicensed frequency according to the aforementioned second embodiment. First, similar to the second embodiment, the radio terminal (UE) 3 receives from the radio base station (LTE-U eNB) 1, in the serving cell on the licensed frequency, configuration information regarding the terminal measurement (i.e., the instruction for the terminal measurement report) (in the non-serving cell) on the unlicensed frequency. Then the radio terminal (UE) 3 determines whether the unlicensed frequency satisfies a predetermined condition regarding the cell detection for the terminal measurement, generates a result of the terminal measurement based on the reception quality of a reference signal transmitted in the cell on the unlicensed frequency, which has been measured during a period in which the predetermined condition is satisfied, and reports the result to the radio base station 1. The radio terminal 3 may perform the terminal measurement only when this condition is satisfied or may use only the measurement values that are obtained when the condition is satisfied in an averaging operation (L3 filtering) to be performed to calculate the result of the terminal measurement.

The predetermined condition regarding the cell detection for the terminal measurement may be, for example, one or any combination of the following conditions:
 a cell-specific signal has been successfully detected;
 the cell-specific signal is being successfully detected (i.e., during a period in which the cell-specific signal is being successfully detected);
 the reception quality of the cell-specific signal is equal to or higher than a predetermined threshold (or higher than the threshold);
 a cell selection criterion (or a cell reselection criterion) has been satisfied;
 the cell selection criterion (or the cell reselection criterion) is being satisfied (i.e., during a period in which the cell selection criterion or the cell reselection criterion is being satisfied);
 no signal from another system has been detected;
 no signal from another system is being detected (i.e., during a period in which no signal from other systems is being detected); and
 the reception quality of a signal from another system is equal to or lower than a predetermined value (or smaller than a predetermined value).

The cell-specific signal may be, for example, a synchronization signal (in LTE, the synchronization signal includes a PSS and an SSS), a reference signal (RS), or basic information (MIB) or system information (SIB: e.g., SIB1, SIB2, or SIBx defined for LTE-U) broadcasted in the cell. Since the examples of the reference signal and the examples of the reception quality of the reference signal are similar to those in the aforementioned embodiments, the detailed descriptions thereof will be omitted.

The cell selection criterion (or the cell reselection criterion) may be, for example, the predetermined criterion (condition) that is used in the existing cell selection (or the cell reselection) in the RRC_IDLE state or may be a newly defined criterion (condition) for the cell selection (or the cell reselection) on the unlicensed frequency.

The other system may be, for example, a radar system or a wireless LAN (WLAN) and the signal form the other system may be, for example, a reference signal or may be some or all of the signals transmitted in the frequency of this system. Further, the reception quality of the other system may be, for example, an RSSI, an RCPI, or an RSNI.

Since the examples of the terminal measurement and the terminal measurement report are similar to those in the aforementioned embodiments, the detailed descriptions thereof will be omitted.

Accordingly, the accuracy of the terminal measurement on the unlicensed frequency performed by the radio terminal 3 is improved. As a result, the determination by the radio base station 1 that determines the radio terminal allowed to perform LTE-U using the unlicensed frequency becomes accurate as well.

Specific Example 3

Figure 10:
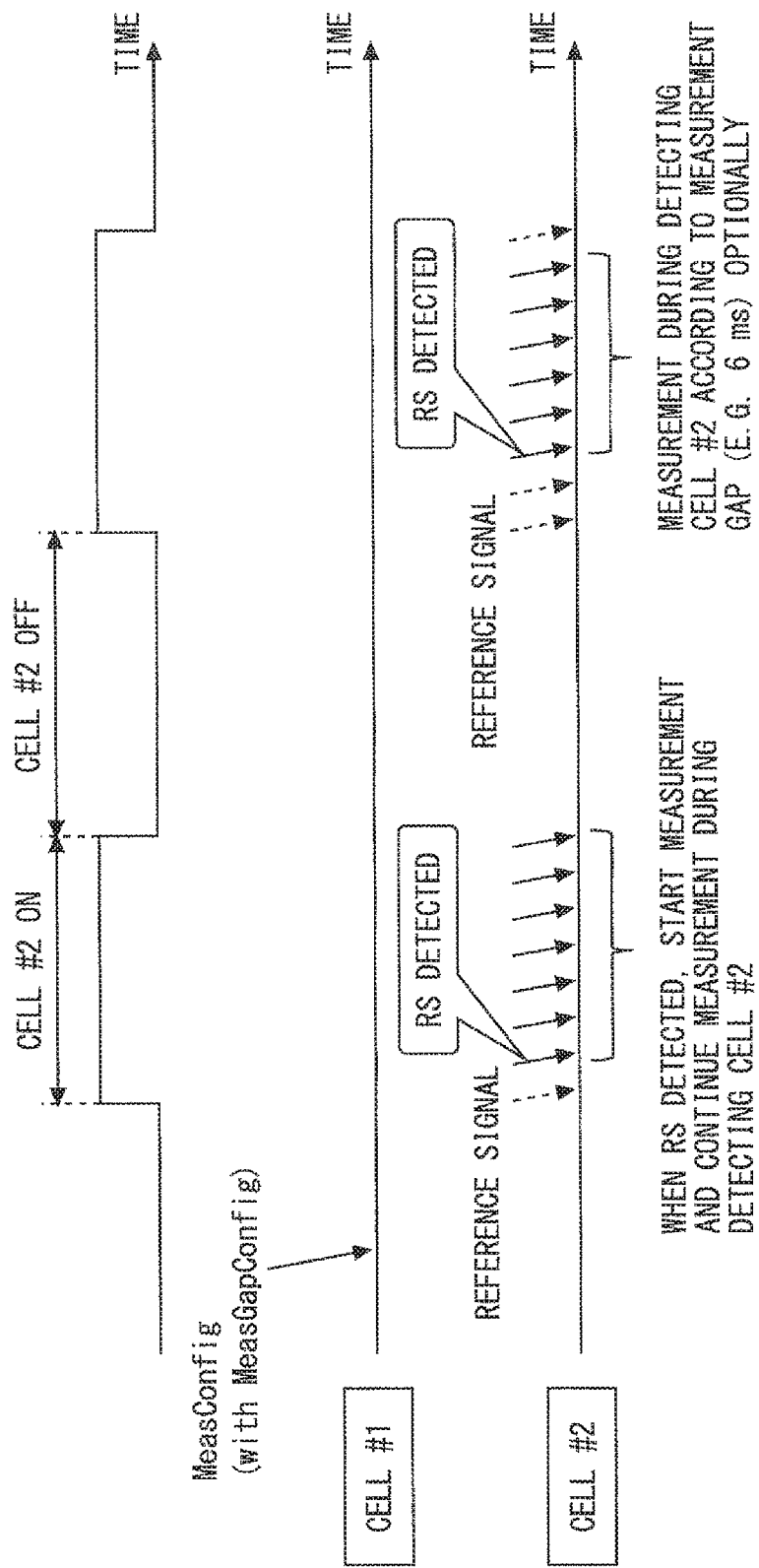
FIG. 10 is a diagram showing one example of the terminal measurement by the radio terminal according to the second embodiment (specific example 3)

A specific example 3 according to the third embodiment will be described. FIG. 10 is a diagram for describing the terminal measurement by the radio terminal (UE) 3 in the cell (Cell #2) on the unlicensed frequency (F2) according to the specific example 3. Similar to FIG. 9 according to the specific example 2, the radio base station (LTE-U eNB) 1 dynamically switches the operation state of the Cell #2 based on the result of the sensing for other systems. In the specific example 3, the condition that the cell-specific signal is being successfully detected (i.e., during the period in which the cell-specific signal is being successfully detected) is used as the predetermined condition regarding the cell detection. Further in this example, the cell-specific signal on the unlicensed frequency is the reference signal (RS).

In FIG. 10, the radio base station (LTE-U eNB) 1 first transmits to the radio terminal (UE) 3, in the cell (Cell #1) by an RRC signaling or the like, the configuration information necessary for the terminal measurement (Measurement Configuration: MeasConfig) (in the cell (Cell #2)) on the unlicensed frequency (F2). The MeasConfig may include configuration information of the terminal measurement gap (Measurement Gap Configuration: MeasGapConfig) used for the terminal measurement (option).

In one example, the UE 3 performs the terminal measurement only when the UE 3 can be detecting the reference signal (RS) in the Cell #2 and ends the terminal measurement when the UE 3 cannot detect the RS any more (left side in FIG. 10). In this case, the UE 3 may simultaneously receive the downlink signals on both the licensed frequency and the unlicensed frequency using a plurality of receivers (e.g., Dual receivers). Instead, the UE 3 may autonomously configure a gap period (autonomous gap configuration), suspend the reception of the downlink signal on the licensed frequency in accordance with the gap period, and receive the downlink signal on the unlicensed frequency.

In another example, the UE 3 may perform the terminal measurement only when the UE 3 can be detecting the reference signal (RS) in the Cell #2 during the measurement period of the terminal measurement gap (Measurement Gap Length, e.g., 6 ms) and end the terminal measurement when the UE 3 cannot detect the RS any more or when the Measurement Gap Length ends (right side in FIG. 10).

The aforementioned terminal measurement may be, for example, calculation of an instantaneous measurement value of the reception quality of the reference signal, may be execution of a primary measurement (L1 filtering), or may be execution of a secondary measurement (L3 filtering).

Fourth Embodiment

Figure 11:
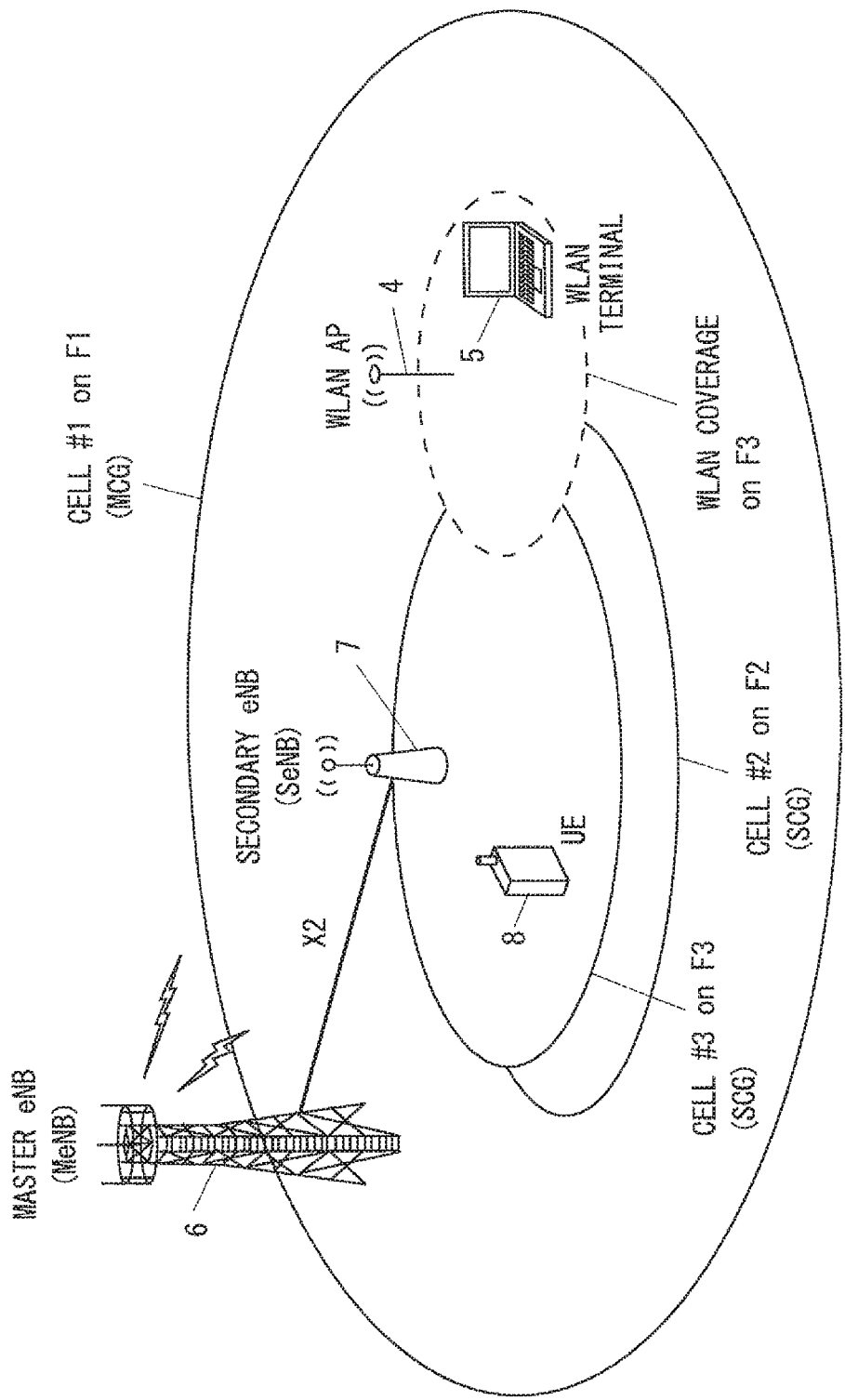
FIG. 11 is a diagram showing a configuration example of the radio communication system and the other radio system according to several embodiments.

A fourth embodiment according to the present invention will be described. FIG. 11 is a diagram showing a configuration example of an LTE-U radio communication system and another system according to a plurality of embodiments including this embodiment. The main difference from FIGS. 1A and 1B is that the radio base stations (eNBs) 6 and 7 and a radio terminal (UE) 8 have a Dual Connectivity (DC) function (Non-Patent Literature 5). The Dual Connectivity is processing in which the UE 8 performs communication simultaneously using radio resources (i.e., cells or carriers) provided (i.e., managed) by a main base station (master base station, Master eNB (MeNB)) 6 and a sub base station (secondary base station, Secondary eNB (SeNB)) 7. In the example shown in FIG. 11, the MeNB 6 and the SeNB 7 are connected to each other via an X2 interface, the MeNB 6 manages Cell #1 on the licensed frequency F1, and the SeNB 7 manages both Cell #2 on the licensed frequency F2 and Cell #3 on the unlicensed frequency F3. The MeNB 6 and the SeNB 7 operate as normal LTE eNBs for UEs that do not perform the DC and are able to independently communicate with these UEs in the Cell #1 and the Cell #2, respectively.

The following briefly describes the Dual Connectivity. The UE 8 is able to perform carrier aggregation (CA) simultaneously using multiple cells that are managed by the MeNB 6 and the SeNB 7 and on different frequencies. The group of serving cells managed by the MeNB 6 is referred to as a Master Cell Group (MCG) and the group of serving cells managed by the SeNB 7 is referred to as a Secondary Cell Group (SCG). The MCG includes at least a Primary Cell (PCell) and may further include one or more Secondary Cells (SCells). The SCG includes at least a Primary SCell (abbreviated as a pSCell or a PSCell) and may further include one or more SCells. The pSCell is a cell to which at least the physical uplink control channel (PUCCH) is allocated and serves as the PCell in the SCG.

The MeNB 6 maintains a connection (S1-MME) with a mobility management apparatus (Mobility Management Entity (MME)) in a core network (Evolved Packet Core (EPC)) for the UE 8 executing the DC. Accordingly, the MeNB 6 may be referred to as a mobility management point (or a mobility anchor) for the UE 8. Therefore, control information of the Control Plane (CP) is transmitted between the MeNB 6 and the UE 8 in the MCG. Control information of the CP regarding the SCG of the SeNB 7 is transmitted between the SeNB 7 and the MeNB 6 (X2 interface) and is further transmitted between the MeNB 6 and the UE 8 in the MCG. For example, Radio Resource Configuration of the SCG (e.g., RadioResoureConfigDedicated IE) is transmitted from the SeNB 7 to the MeNB 6 by an inter-node RRC message referred to as "SCG-Configuration" and is transmitted from the MeNB 6 to the UE 8 by an RRC Connection Reconfiguration message. On the other hand, terminal capability information (UE-EUTRA capabilities IE) of the UE 8, security information (e.g., S-K$_{eNB}$) about the SCG, Radio Resource Configuration (e.g., RadioResourceConfigDedicated IE) of the MCG and the like are transmitted from the MeNB 6 to the SeNB 7 by an inter-node RRC message referred to as "SCG-ConfigInfo".

In the DC, from the viewpoint of the bearer configuration on the User Plane (UP), three different configurations are supported. The first configuration is an MCG bearer. The MCG bearer is a bearer in which radio protocols are arranged only in the MeNB 6 in order to use only resources (e.g., the MCG) of the MeNB 6 and a connection (S1-U) is maintained between a gateway apparatus (S-GW or P-GW) and the MeNB 6, similar to normal LTE that does not perform the DC. The second configuration is an SCG bearer. The SCG bearer is a bearer in which the radio protocols are arranged only in the SeNB 7 in order to use only resources (e.g., the SCG) of the SeNB 7 and the connection (S1-U) is maintained between the gateway apparatus (S-GW or P-GW) and the SeNB 7. The third configuration is a Split bearer. The Split bearer is a bearer in which the radio protocols are arranged in both the MeNB 6 and the SeNB 7 in order to use resources (e.g., MCG and SCG) both of the MeNB 6 and the SeNB 7. In the Split bearer, the connection (S1-U) is maintained between the gateway apparatus (S-GW or P-GW) and the MeNB 6 and UP data (e.g., PDCP PDU) to be transmitted in the SCG is forwarded, for example, from the MeNB 6 to the SeNB 7 via the X2.

Figure 12:
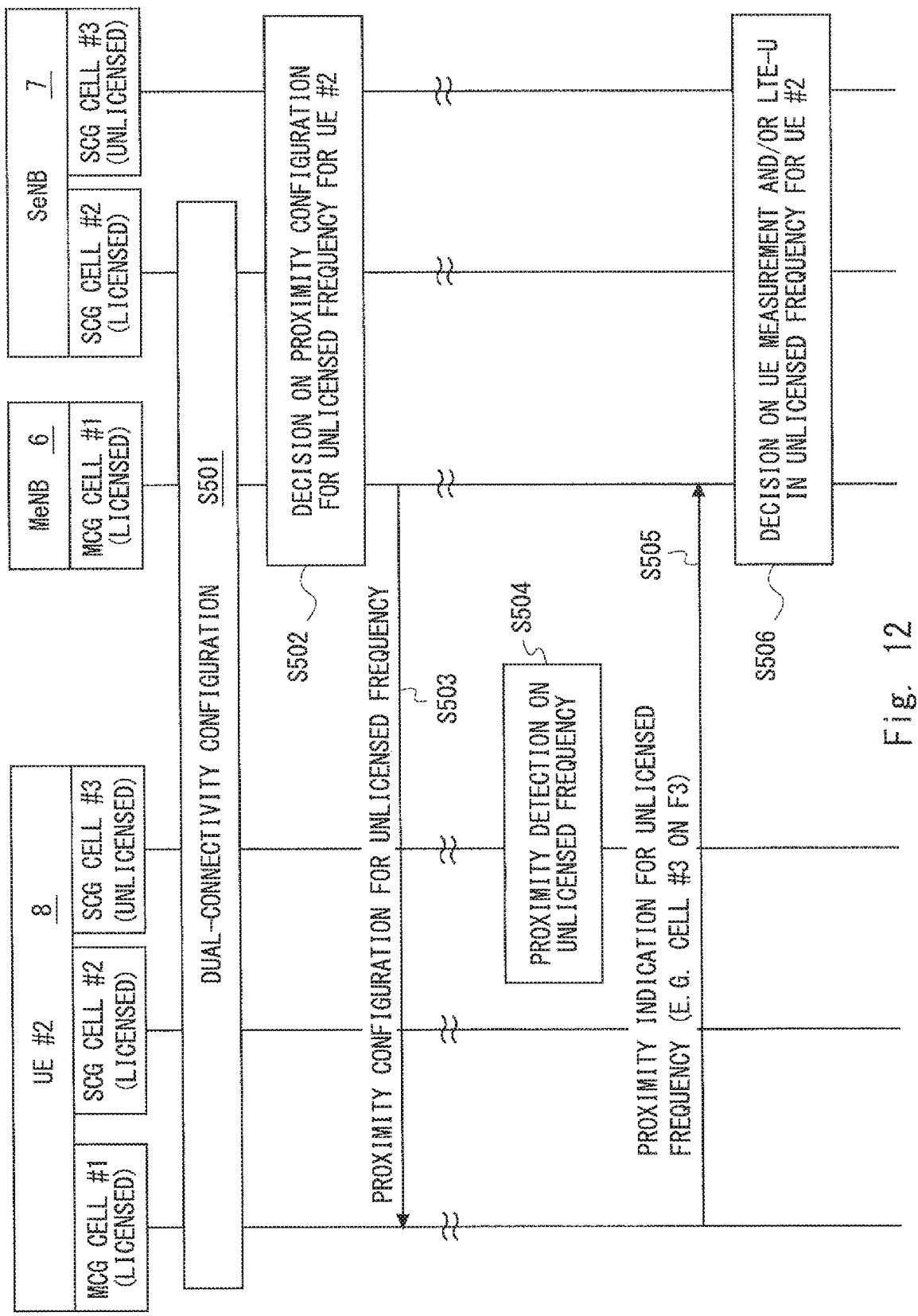
FIG. 12 is a sequence diagram showing one example of operations of two radio base stations and a radio terminal according to a fourth embodiment.

The following describes the details of this embodiment. In the example of the DC in FIG. 11, when LAA is achieved by carrier aggregation of the Cell #3 on the unlicensed frequency F3 of the SeNB 7 and the Cell #2 on the licensed frequency F2 of the SeNB 7, the problem may not be solved only by the techniques described in the aforementioned first to third embodiments. This is because the SeNB 7 cannot directly transmit or receive control information (e.g., RRC, NAS) of the CP to or from the radio terminal (UE 8) when the DC is performed. The aforementioned notification regarding proximity to the cell on the unlicensed frequency (Proximity configuration for unlicensed frequency) and the report regarding proximity to the cell on the unlicensed frequency (Proximity indication for unlicensed frequency) correspond to the control information of the CP. Further, the configuration information for the terminal measurement (MeasConfig) and the report regarding the result of the terminal measurement (Measurement report) also correspond to the control information of the CP. With reference to FIG. 12, a control procedure for solving the further problem in the DC will be described. FIG. 12 is a sequence diagram showing operations of the radio base stations (the MeNB 6 and the SeNB 7) and the radio terminal (UE) 8 according to the fourth embodiment. The radio terminal (UE) 8 is denoted as "UE #2" in FIG. 12.

First, the UE 8 establishes a radio connection (RRC Connection) using the Cell #1 of the MeNB as the PCell and performs configuration that is necessary for the Dual Connectivity (DC) so that the Cell #2 of the SeNB can be used as the pSCell (Dual Connectivity Configuration, S501). Then it is determined whether the MeNB 6 or the SeNB 7 allows the UE 8 to activate the function of detecting proximity to the cell on the unlicensed frequency (e.g., F3)

(Decision on proximity configuration for unlicensed frequency for UE #2, S502). When it is determined that this detection function is activated, the MeNB 6 transmits, in the Cell #1, the notification regarding the detection of the proximity to the cell on the unlicensed frequency (e.g., F3) to the UE 8 using, for example, the RRC Connection Reconfiguration message (proximity configuration for unlicensed frequency, S503). When the UE 8 receives this notification (i.e., in response to this notification), the UE 8 attempts the detection of the proximity to the cell on the unlicensed frequency (i.e., the detection function is activated). When the cell (e.g., Cell #3) has been successfully detected on the unlicensed frequency (e.g., F3) (Proximity detection on unlicensed frequency, S504), the UE 8 transmits the result of the detection to the MeNB 6 (Proximity indication for unlicensed frequency (e.g., Cell #3 on F3), S505). While not shown in the drawings, the MeNB 6 may forward the result of the detection transmitted from the UE 8 to the SeNB 7. Then the MeNB 6 or the SeNB 7 determines, based on this proximity indication, whether to require the UE 8 to perform the terminal measurement on the unlicensed frequency (e.g., F3) and/or whether to allow the UE 8 to perform LTE-U in the cell (e.g., Cell #3) on the unlicensed frequency or determine both (Decision on UE measurement and/or LTE-U in unlicensed frequency for UE #2, S506). When it is determined that the UE 8 is allowed to perform communication in the Cell #3 (LTE-U), the SeNB 7 performs LAA with carrier aggregation of the Cell #2 and the Cell #3 and, for example, transmits user data (DL data) (not shown).

Using the aforementioned procedure, even when the Dual Connectivity is being executed, it is possible to appropriately select the radio terminal 3 that is required to perform the terminal measurement (in the cell) on the unlicensed frequency managed by the SeNB 7, or the radio terminal 3 that is allowed to perform LTE-U (in the cell) on the unlicensed frequency, or both. As a result, it can be expected to improve performance (e.g., system throughput) of the whole LTE radio communication system.

Specific Example 4

A specific example 4 according to the fourth embodiment will be described. The specific example 4 provides a procedure for determining, in the MeNB 6 or the SeNB 7, whether to transmit to the UE 8 an instruction for activating the function of detecting the proximity to the cell on the unlicensed frequency (e.g., F3).

Figure 13:
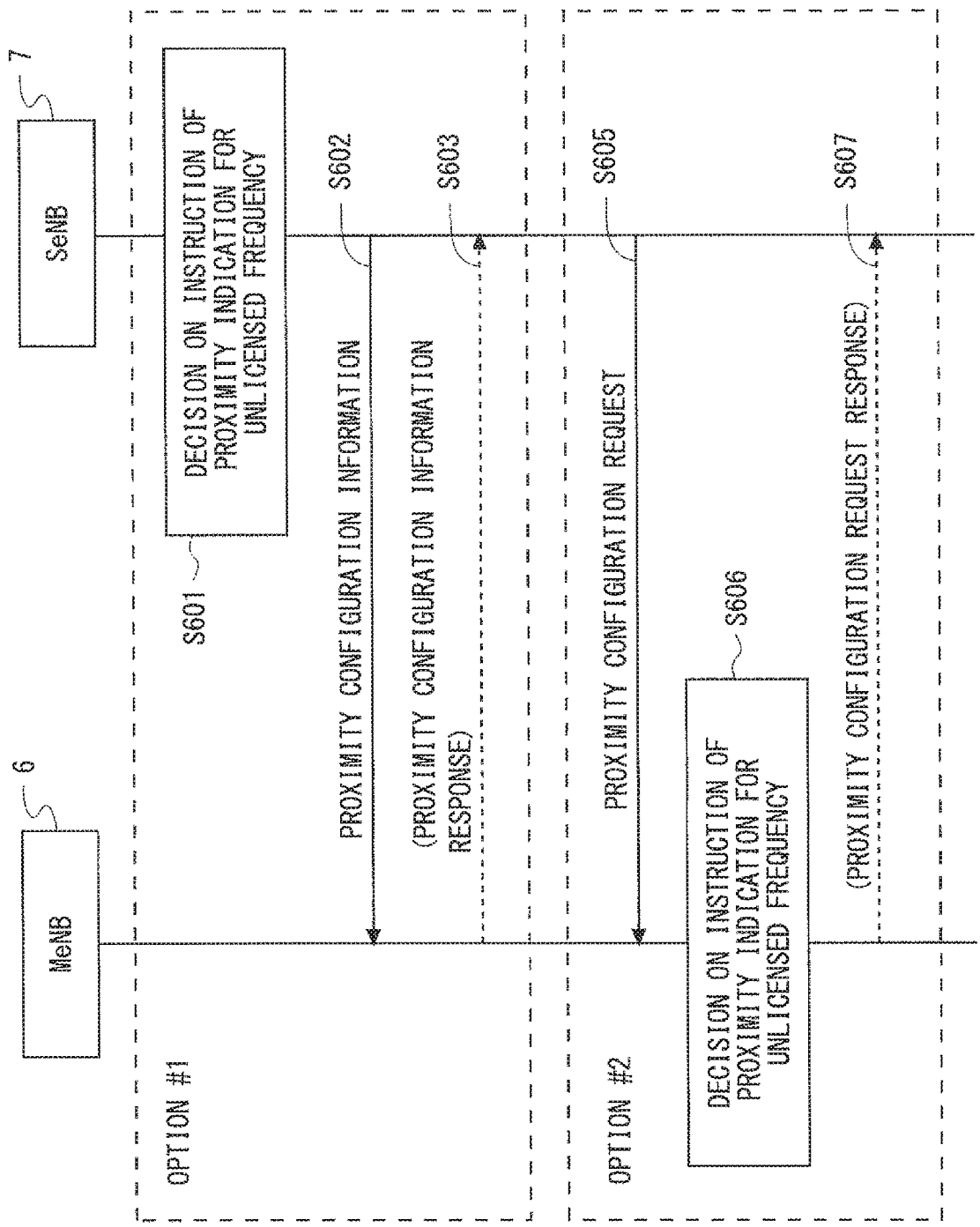
FIG. 13 is a sequence diagram showing an example of operations of two radio base stations (an MeNB and an SeNB) according to the fourth embodiment (specific example 4)

FIG. 13 is a diagram showing an example of operations of the MeNB 6 and the SeNB 7 including exchange of information (X2 message) in Step S502 of FIG. 12 "Decision on proximity configuration for unlicensed frequency". There are two options for the operations of the MeNB 6 and the SeNB 7. In the first option (Option 1), the SeNB 7 determines whether to transmit to the UE 8 the instruction for activating the function of detecting the proximity to the cell on the unlicensed frequency (Decision on instruction of proximity indication for unlicensed frequency, S601). When the SeNB 7 determines that this instruction should be transmitted to the UE 8, the SeNB 7 transmits, to the MeNB 6, information necessary to determine the proximity to the cell on the unlicensed frequency (Proximity Configuration Information) (S602). Then the MeNB 6 transmits this information to the UE 8 as the notification regarding the detection of the proximity to the cell on the unlicensed frequency (proximity configuration for unlicensed frequency), or transmits to the UE 8 the notification including this information (not shown). The MeNB 6 may transmit to the SeNB 7 a response message indicating that it has received the information or a message indicating that it is going to transmit (or it has transmitted) this notification based on this information (Proximity Configuration Information Response, S603). The MeNB 6 and the SeNB 7 may perform processing of Option 1 in FIG. 13 after confirming that the unlicensed frequency is available by, for example, the aforementioned first sensing or second sensing.

The information necessary to detect proximity to the cell on the unlicensed frequency, which is transmitted in S602, may be transmitted in "SCG-Configuration" of an inter-node RRC container. Instead, this information may be transmitted by an SeNB MODIFICATION REQUIRED message on the X2 interface (X2AP). Furthermore, the message in S603 may be transmitted by an SeNB MODIFICATION CONFIRM message.

On the other hand, in the second option (Option 2), the SeNB 7 first requests the MeNB 6 to transmit this instruction to the UE 8 (Proximity Configuration Request, S605). Upon receiving this request, the MeNB 6 determines whether to transmit this instruction to the UE 8 (Decision on instruction of proximity indication for unlicensed frequency, S606). Upon determining that this instruction should be transmitted to the UE 8, the MeNB 6 transmits the notification regarding the detection of proximity to the cell on the unlicensed frequency (proximity configuration for unlicensed frequency) to the UE 8 (not shown). The MeNB 6 may transmit to the SeNB 7 a message indicating the result of the determination regarding whether to transmit the instruction or a message indicating the rejection of this request (Proximity Configuration Request Response, S607). The MeNB 6 and the SeNB 7 may perform processing of Option 2 shown in FIG. 13 after confirming that the unlicensed frequency is available by, for example, the aforementioned first sensing or second sensing.

The request for transmitting to the UE 8 the instruction for activating the function of detecting the proximity to the cell on the unlicensed frequency in S605 may be transmitted in "SCG-Configuration" of the inter-node RRC container. Instead, this request may be transmitted by an SeNB MODIFICATION REQUIRED message on the X2AP. Furthermore, the message transmitted in S607 may be transmitted by an SeNB MODIFICATION CONFIRM message.

Specific Example 5

A specific example 5 according to the fourth embodiment will be described. The specific example 5 provides a procedure performed by the MeNB 6 or the SeNB 7 to determine, based on the proximity indication, whether to require the UE 8 to perform the terminal measurement on the unlicensed frequency (e.g., F3) or whether to allow the UE 8 to perform LTE-U in the cell (e.g., Cell #3), in response to the reception by the MeNB 6 of the Proximity Indication indicating that the UE 8 has detected the proximity to the cell on the unlicensed frequency (e.g., F3).

Figure 14:
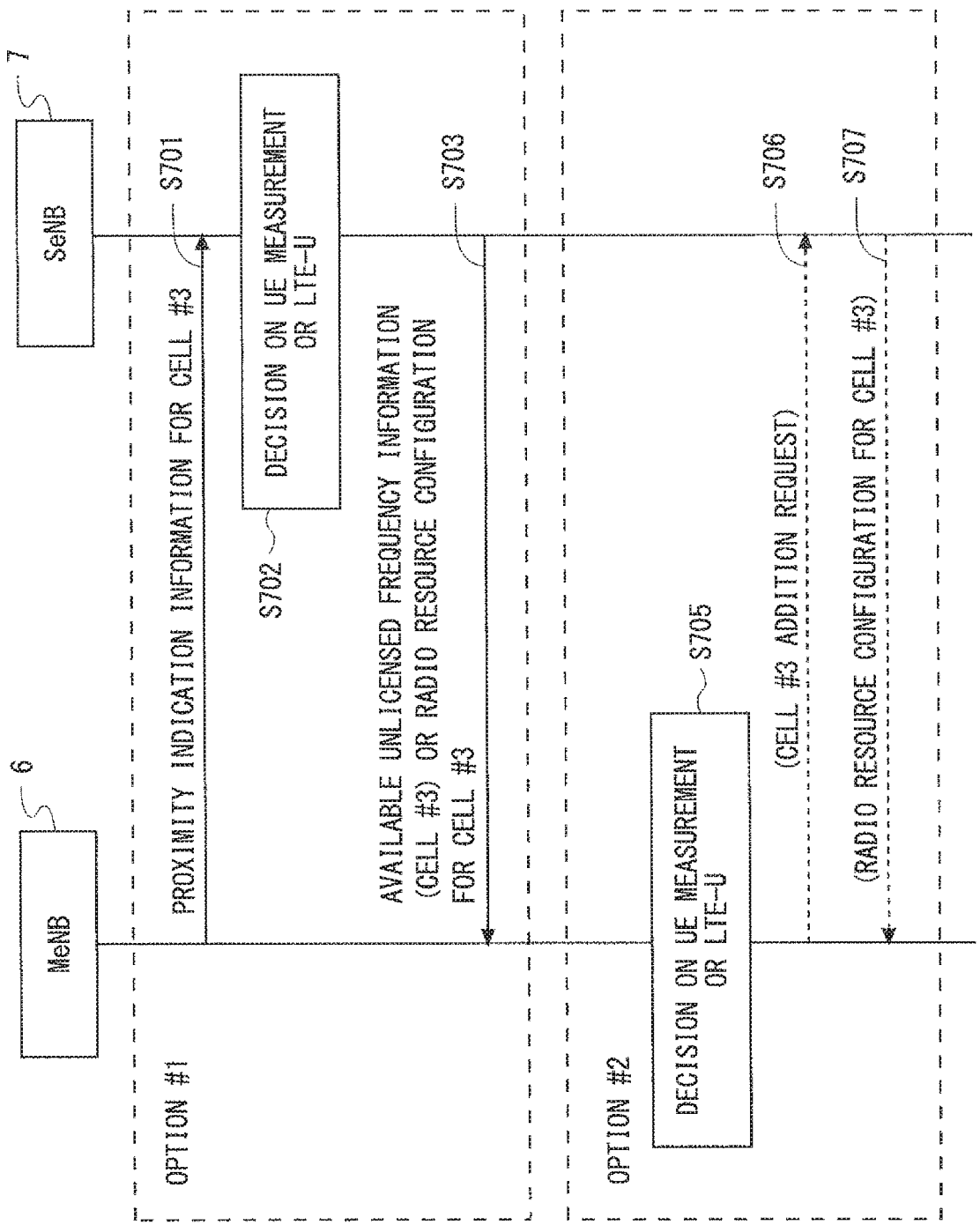
FIG. 14 is a sequence diagram showing an example of operations of two radio base stations (an MeNB and an SeNB) according to a third embodiment (specific example 5)

FIG. 14 is a diagram showing an example of operations of the MeNB 6 and the SeNB 7 including exchange of information (X2 messages) in Step S506 of FIG. 12 "Decision on UE measurement and/or LTE-U in unlicensed frequency". There are two options for the operations of the MeNB 6 and the SeNB 7. In the first option (Option 1), the MeNB 6 forwards (at least some of the information included in) the Proximity Indication to the SeNB 7 (Proximity indication information for Cell #3, S701) and the SeNB 7 determines, for example, whether to require the UE 8 to perform the terminal measurement for the Cell #3 or whether to allow the UE 8 to perform LTE-U in the Cell #3 (Decision on UE measurement or LTE-U, S702). When the SeNB 7 determines to require the UE 8 to perform the terminal measurement, the SeNB 7 transmits, to the MeNB 6, information regarding the unlicensed frequency on which the terminal measurement to be performed, which includes at least the Cell #3 (Available Unlicensed frequency information, S703-1). Further or alternatively, when the SeNB 7 determines to allow the UE 8 to perform LTE-U, the SeNB 7 generates the radio resource configuration information (e.g., RadioResourceConfigCommon, RadioResourceConfigDedicated) for Cell #3 and transmits the generated radio resource configuration information to the MeNB 6 (Radio Resource Configuration for Cell #3, S703-2).

The Proximity indication information in S701 may be transmitted in "SCG-ConfigInfo" of an inter-node RRC container. Alternatively, this information may be transmitted by an SeNB MODIFICATION REQUEST message on the X2AP. Further, the information in S703 may be transmitted in "SCG-Configuration" of an inter-node RRC container. Alternatively, this information may be transmitted by an SeNB MODIFICATION REQUEST ACKNOWLEDGEMENT message on the X2AP or by an SeNB MODIFICATION REQUIRED message on the X2AP.

On the other hand, in the second option (Option 2), the MeNB 6 determines whether to require the UE 8 to perform the terminal measurement for the Cell #3 or to allow the UE 8 to perform LTE-U in the Cell #3 (Decision on UE measurement or LTE-U, S705). When the MeNB 6 determines to require the UE 8 to perform the terminal measurement, the MeNB 6 may transmit to the UE 8 the terminal measurement information (Measurement configuration) including at least information regarding the Cell #3 or the unlicensed frequency F3 (not shown). Further or alternatively, when the MeNB 6 determines to allow the UE 8 to perform LTE-U, the MeNB 6 transmits to the SeNB 7 a request for adding the cell (Cell #3) on the target unlicensed frequency to the serving cell(s) (e.g., SCG) (Cell #3 addition request, S706). The information regarding the Cell #3 in this request may be indicated by the information regarding the unlicensed frequency (e.g., EARFCN) and the PCI of the Cell #3, or indicated by the ECGI of the Cell #3, or indicated by a combination thereof. The SeNB 7 generates radio resource configuration information (e.g., RadioResourceConfigCommon, RadioResourceConfigDedicated) on the Cell #3 in response to the request and transmits the generated radio resource configuration information to the MeNB 6 (Radio resource configuration for Cell #3, S707).

The request in S706 may be transmitted in "SCG-ConfigInfo" of an inter-node RRC container. Alternatively, this request may be transmitted by an SeNB ADDITION REQUEST message on the X2AP or by an SeNB MODIFICATION REQUEST message on the X2AP. Further, the message in S707 may be transmitted by "SCG-Configuration", similar to the message in S703. Alternatively, this message may be transmitted by an SeNB ADDITION REQUEST ACKNOWLEDGE message on the X2AP or by an SeNB MODIFICATION REQUEST ACKNOWLEDGE message on the X2AP.

Lastly, configuration examples of the radio base stations (the LTE-U eNB 1, the MeNB 6, the SeNB 7) and the radio terminals (the UE 3, the UE 8) according to the aforementioned embodiments will be described. Each of the radio base stations (the LTE-U eNB 1 the MeNB 6, the SeNB 7) described in the aforementioned embodiments may include a transceiver to communicate with a radio terminal (the UE 3, the UE 8) and a controller that is coupled to the transceiver. This controller executes the control procedure regarding one of the radio base stations (the LTE-U eNB 1, the MeNB 6, the SeNB 7) described in the aforementioned embodiments (e.g., control of detection of proximity to the non-serving cell performed by a radio terminals (the UE 3, the UE 8)).

Each of the radio terminals (the UE 3, the UE 8) described in the aforementioned embodiments may include a transceiver to communicate with a radio base station (the LTE-U eNB 1, the MeNB 6, the SeNB 7) and a controller that is coupled to the transceiver. The controller executes the control procedure regarding one of the radio terminals (the UE 3, the UE 8) described in the aforementioned embodiments (e.g., the procedure for controlling the detection of proximity (the UE 3 and the UE 8) to the non-serving cell and reporting the result of the detection to the radio base station (the LTE-U eNB 1, the MeNB 6, the SeNB 7)).

Figure 15:
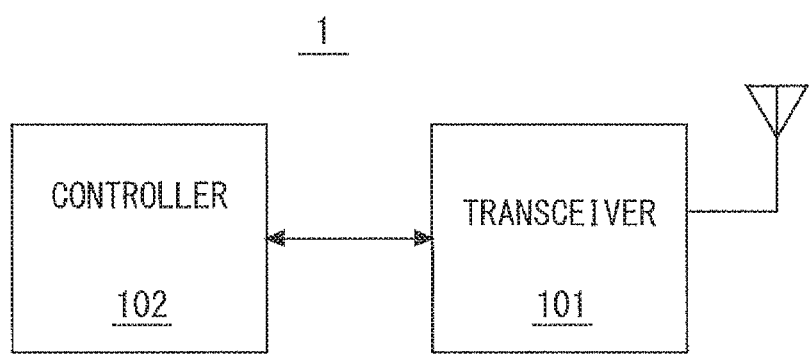
FIG. 15 is a block diagram showing a configuration example of a radio base station according to several embodiments.
Figure 16:
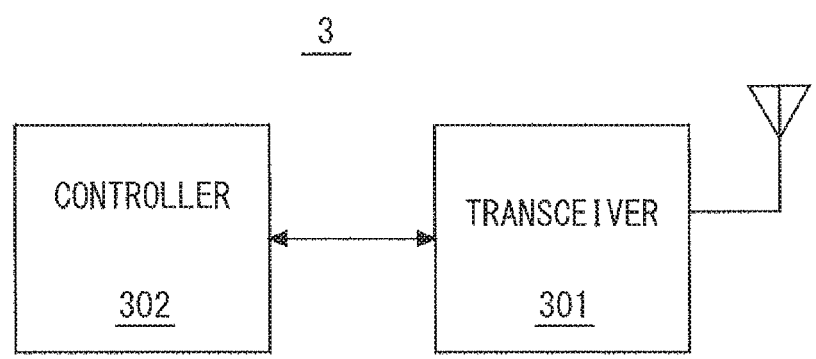
FIG. 16 is a block diagram showing a configuration example of a radio terminal according to several embodiments.
Figure 17:
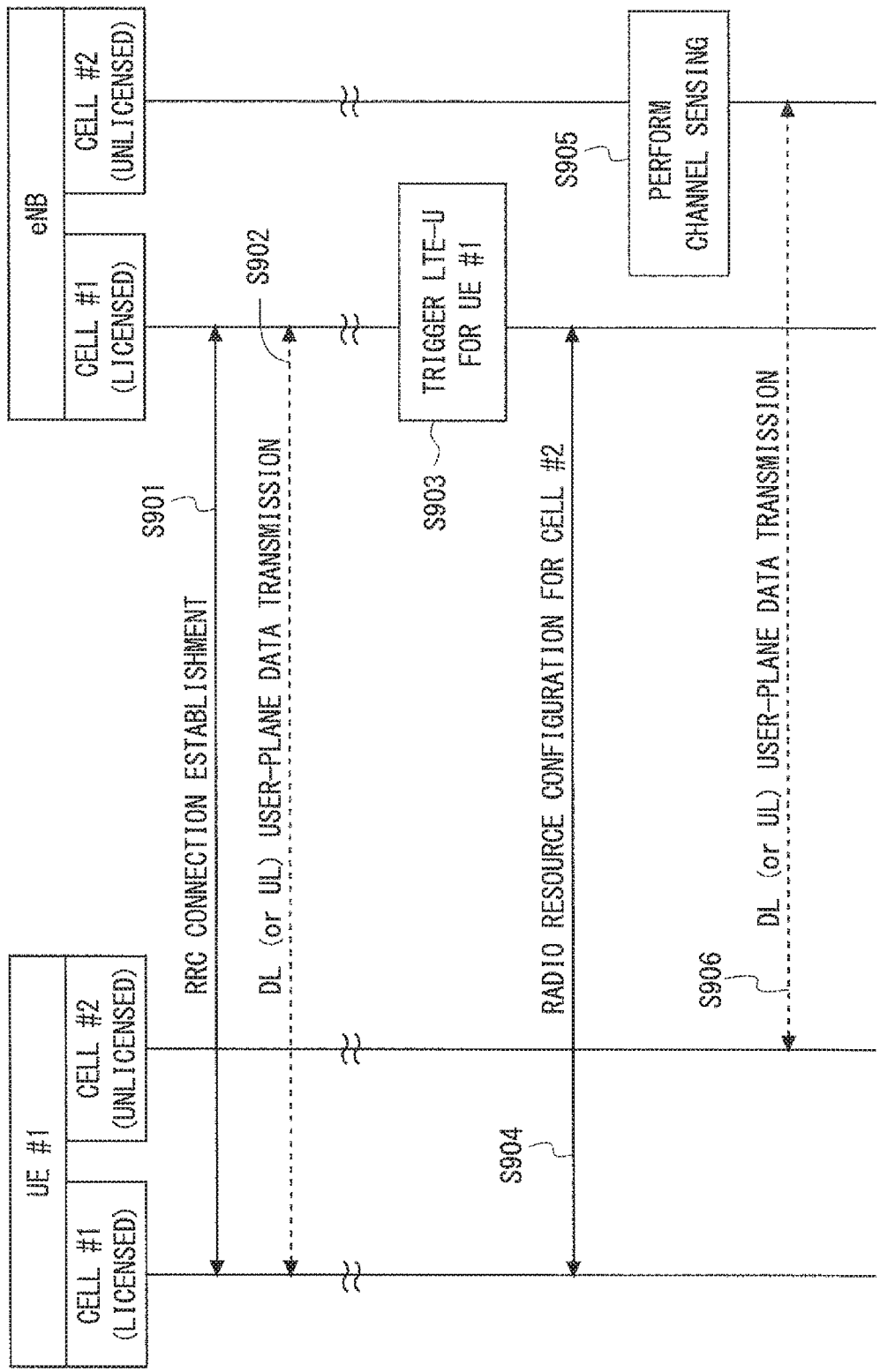
FIG. 17 is a sequence diagram showing one example of operations of a radio base station and a radio terminal in LTE-U.

FIGS. 15 and 16 are block diagrams showing the configuration examples of the radio base station 1 and the radio terminal 3 according to the first embodiment. The radio base stations and the radio terminals according to the other embodiments may have the configurations similar to those in FIGS. 15 and 16. Referring to FIG. 15, the radio base station 1 includes a transceiver 101 and a controller 102. The transceiver 101 is configured to communicate with a plurality of radio terminals including the radio terminal 3. The controller 102 is configured to transmit a notification to the radio terminal 3 and to receive the report regarding the result of the detection from the radio terminal 3 in order to detect proximity to the non-serving cell in the radio terminal.

Referring to FIG. 16, the radio terminal 3 includes a transceiver 301 and a controller 302. The transceiver 301 is configured to communicate with the radio base station 1. The controller 302 is configured to control the detection of proximity to the non-serving cell in accordance with the notification received from the radio base station 1 and to transmit the result of the detection to the radio base station 1.

Each of the controllers included in the radio base stations and the radio terminals according to the aforementioned embodiments may be implemented by causing a computer including at least one processor (e.g., a microprocessor, a Micro Processing Unit (MPU), a Central Processing Unit (CPU)) to execute a program. Specifically, one or more programs including instructions that cause the computer to perform an algorithm regarding the UE or the eNB described with reference to sequence diagrams and the like may be supplied to the computer.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM). CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The explanations of the first to fourth embodiments have been provided with regard to the case where the unlicensed frequency is used for transmitting downlink user data. It is needless to say, however, that these embodiments can be applied to a case in which the unlicensed frequency is used for transmitting uplink user data as well. In this case, the radio terminal (UE) 3 may perform a process similar to the first sensing or the second sensing performed by the radio base station (LTE-U eNB) 1. It is therefore possible to avoid degradation of performance of not only the LTE-U system but also other systems, which is due to transmission of the uplink signal in LTE-U being excessive interference to the other systems.

The explanations of the first to fourth embodiments have been provided with regard to the case of the LAA. That is, in the first to third embodiments, carrier aggregation (CA) in which the radio base station (LTE-U eNB) 1 and the radio terminal (UE) 3 use the cell on the licensed frequency as the primary cell (PCell) and use the cell on the unlicensed frequency as the secondary cell (SCell) has been mainly described. In the fourth embodiment, the Dual Connectivity (DC) in which the MeNB 6 and the SeNB 7 use the licensed frequency and the SeNB 7 further uses the unlicensed frequency has been mainly described. However, as already stated above, in the first to third embodiments, the radio base station (LTE-U eNB) 1 may perform carrier aggregation (CA) using a shared frequency (e.g., F3) as the PCell and using an unlicensed frequency in a narrow sense (e.g., F2) or another shared frequency e.g., F4) as the secondary cell (SCell). The unlicensed frequency in a narrow sense means a frequency that is not allocated to any operator (i.e., a frequency that is neither the licensed frequency nor the shared frequency). In this case, the radio base station (LTE-U eNB) 1 may transmit, to the radio terminal (UE) 3 in the PCell (e.g., F3), the notification regarding the detection of proximity to the SCell (e.g., F2 or F4) and the radio terminal (UE) 3 may transmit the proximity detection result to the radio base station (LTE-U eNB) 1 in the PCell (e.g., F3). In a similar way, in the fourth embodiment, the MeNB 6 may use a shared frequency and the SeNB 7 may use a shared frequency or an unlicensed frequency in a narrow sense in the Dual Connectivity (DC).

The explanations of the aforementioned embodiments have been provided with regard to the LTE system. However, as already stated above, these embodiments may be applied to radio communication systems other than the LTE system such as the 3GPP UMTS, the 3GPP2 CDMA2000 system (1×RTT, HRPD), the GSM/GPRS system, or the WiMAX system. The radio base station (eNB) and the RRH/RRE having the function of performing the LTE communication on the unlicensed frequency have been referred to as a radio base station (LTE-U eNB). In the other systems as well, a network node capable of communicating on the unlicensed frequency using the same communication scheme as that used for the licensed frequency may be introduced and it may be referred to as a radio station. That is, the radio station corresponds, for example, to a radio base station (eNB) and an RRH/RRE in the LTE as described above, to a base station (NodeB (NB)) and a base station controller (RNC) in the UMTS, or to a base station (BTS) and a base station controller (BSC) in the CDMA2000 system. Further, in the example of the Dual Connectivity (DC) in particular, a base station system including a main base station (MeNB in LTE) and a sub base station (SeNB in LTE) may be referred to as a radio station. Each of the main base station and the sub base station may be referred to as a radio communication node.

Further, in the aforementioned embodiments, the cell on the licensed frequency in which the notification regarding the detection of the proximity is transmitted (i.e., the PCell in CA or the cell operated by the MeNB in the DC) and the cell on the unlicensed frequency to be the target of the detection of the proximity (i.e., the SCell in CA or the cell operated by the SeNB in the DC) may use Radio Access Technologies (RATS) different from each other. For example, the cell on the licensed frequency may be a cell of LTE (E-UTRAN) and the cell on the unlicensed frequency may be a cell of UMTS (UTRAN).

The embodiments stated above are merely examples regarding applications of the technical ideas obtained by the present inventor. These technical ideas are not limited only to the embodiments described above, and various modifications may be made as a matter of course.

This application is based upon and claims the benefit of priority from Japanese Patent Application No. 2014-186950, filed on Sep. 12, 2014, the disclosure of which is incorporated herein in its entirety by reference.

REFERENCE SIGNS LIST 1, 6, 7 RADIO BASE STATION
3, 8 RADIO TERMINAL
4 WIRELESS LAN ACCESS POINT
5 WIRELESS LAN TERMINAL
101, 301 TRANSCEIVER
102, 302 CONTROLLER

The invention claimed is:

1. A master radio station comprising:
   at least one transceiver configured to communicate with a radio terminal which performs dual connectivity that uses a first cell on a licensed frequency operated by the master radio station that is associated with a first radio access technology and a second cell on an unlicensed frequency operated by a secondary radio station that is associated with a second radio access technology;
   at least one memory that stores instructions; and
   at least one processor configured to execute the instructions to:
      receive a control message from the secondary radio station,
      transmit to the radio terminal, based on the control message, a notification regarding detection or measurement of a non-serving cell on the unlicensed frequency, and
      receive, from the radio terminal, a result of measurement of one or more discovery signals transmitted in the non-serving cell, wherein
         the detection or the measurement is performed by the radio terminal based on the notification.

2. The master radio station according to claim 1, wherein the notification explicitly or implicitly instructs the radio terminal to perform the detection and measurement.

3. The master radio station according to claim 1, wherein the notification comprises at least one of information regarding the unlicensed frequency and information regarding a cell on the unlicensed frequency.

4. The master radio station according to claim 1, wherein the one or more discovery signals comprises a cell-specific signal containing a symbol or a sequence known to the radio terminal and being transmitted in the non-serving cell.

5. The master radio station according to claim 1, wherein the notification is transmitted using system information of a cell on the licensed frequency or using a dedicated control signal dedicatedly transmitted to the radio terminal.

6. The master radio station according to claim 1, wherein the instructions further causes the at least one processor to transmit the notification using the dedicated control signal on a condition that capability information has been received from the radio terminal, the capability information indicating that the radio terminal has a function regarding the detection and the measurement on the unlicensed frequency.

7. The master radio station according to claim 1, wherein the instructions further causes the at least one processor to determine whether to perform communication with the radio terminal on the unlicensed frequency based on the result of the measurement reported from the radio terminal.

8. The master radio station according to claim 1, wherein the non-serving cell has been detected in a predetermined period, which is set depending on whether the radio terminal uses Discontinuous Reception (DRX) or not.

9. A secondary radio station comprising:
at least one transceiver configured to communicate with a radio terminal which performs dual connectivity that uses a first cell on a licensed frequency operated by a master radio station that is associated with a first radio access technology and a second cell on an unlicensed frequency operated by the secondary radio station that is associated with a second radio access technology;
at least one memory that stores instructions; and
at least one processor configured to execute the instructions to transmit a control message to the master radio station, wherein
the master radio station transmits to the radio terminal, based on the control message, a notification regarding detection or measurement of a non-serving cell on the unlicensed frequency.

10. The secondary radio station according to claim 9, wherein the non-serving cell has been detected in a predetermined period, which is set depending on whether the radio terminal uses Discontinuous Reception (DRX) or not.

11. A radio terminal comprising:
at least one transceiver configured to perform dual connectivity that uses a first cell on a licensed frequency operated by a master radio station that is associated with a first radio access technology and a second cell on an unlicensed frequency operated by a secondary radio station that is associated with a second radio access technology;
at least one memory that stores instructions; and
at least one processor configured to execute the instructions to:
receive, from the master radio station, a notification regarding detection or measurement of a non-serving cell on the unlicensed frequency;
measure, based on the notification, one or more discovery signals transmitted in the non-serving cell; and
report, to the first radio station, a result of the measurement of the one or more discovery signals transmitted in the non-serving cell, wherein
the notification is transmitted from the master radio station based on a control message that is transmitted from the secondary radio station to the master radio station.

12. The radio terminal according to claim 11, wherein the non-serving cell has been detected in a predetermined period, which is set depending on whether the radio terminal uses Discontinuous Reception (DRX) or not.

13. A method performed by a master radio station associated with a first radio access technology, the method comprising:
providing a radio terminal with dual connectivity that uses a first cell on a licensed frequency operated by the master radio station and a second cell on an unlicensed frequency operated by a secondary radio station that is associated with a second radio access technology;
receiving a control message from the secondary radio station;
transmitting to the radio terminal, based on the control message, a notification regarding detection or measurement of a non-serving cell on the unlicensed frequency; and
receiving, from the radio terminal, a result of measurement of one or more discovery signals transmitted in the non-serving cell, wherein
the detection or the measurement is performed by the radio terminal based on the notification.

14. The method according to claim 13, wherein the non-serving cell has been detected in a predetermined period, which is set depending on whether the radio terminal uses Discontinuous Reception (DRX) or not.

15. A method performed by a secondary radio station associated with a second radio access technology, the method comprising:
providing the radio terminal with dual connectivity that uses a first cell on a licensed frequency operated by a master radio station that is associated with a first radio access technology and a second cell on an unlicensed frequency operated by the secondary radio station; and
transmitting a control message to the master radio station, wherein
the master radio station transmits to the radio terminal, based on the control message, a notification regarding detection or measurement of a non-serving cell on the unlicensed frequency.

16. The method according to claim 15, wherein the non-serving cell has been detected in a predetermined period, which is set depending on whether the radio terminal uses Discontinuous Reception (DRX) or not.

17. A method performed by a radio terminal, the method comprising:
performing dual connectivity that uses a first cell on a licensed frequency operated by a master radio station that is associated with a first radio access technology and a second cell on an unlicensed frequency operated by a secondary radio station that is associated with a second radio access technology;
receiving, from the master radio station, a notification regarding detection or measurement of a non-serving cell on the unlicensed frequency;
measuring, based on the notification, one or more discovery signals transmitted in the non-serving cell; and
reporting, to the first radio station, a result of the measurement of the one or more discovery signals transmitted in the non-serving cell, wherein
the notification is transmitted from the master radio station based on a control message that is transmitted from the secondary radio station to the master radio station.

18. The method according to claim 17, wherein the non-serving cell has been detected in a predetermined period, which is set depending on whether the radio terminal uses Discontinuous Reception (DRX) or not.

* * * * *